US011968681B2

(12) United States Patent
Gurelli et al.

(10) Patent No.: US 11,968,681 B2
(45) Date of Patent: Apr. 23, 2024

(54) RESOURCE ALLOCATION FOR PIGGYBACK DOWNLINK CONTROL INFORMATION

(71) Applicant: QUALCOMM Incorporated, San Diego, CA (US)

(72) Inventors: Mehmet Izzet Gurelli, San Diego, CA (US); Qiang Wu, San Diego, CA (US); Iyab Issam Sakhnini, San Diego, CA (US); Jun Ma, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/183,778

(22) Filed: Feb. 24, 2021

(65) Prior Publication Data

US 2021/0345387 A1    Nov. 4, 2021

Related U.S. Application Data

(60) Provisional application No. 63/018,317, filed on Apr. 30, 2020.

(51) Int. Cl.
| | | |
|---|---|---|
| *H04W 72/12* | (2023.01) | |
| *H04L 1/16* | (2023.01) | |
| *H04L 1/1607* | (2023.01) | |
| *H04W 72/04* | (2023.01) | |
| *H04W 72/0446* | (2023.01) | |
| *H04W 72/1273* | (2023.01) | |

(Continued)

(52) U.S. Cl.
CPC ........... *H04W 72/23* (2023.01); *H04L 1/1664* (2013.01); *H04W 72/0446* (2013.01); *H04W 72/1273* (2013.01); *H04W 72/535* (2023.01)

(58) Field of Classification Search
CPC ......... H04W 72/1289; H04W 72/1257; H04W 72/1273; H04W 72/0446; H04L 1/1664
See application file for complete search history.

(56) References Cited

U.S. PATENT DOCUMENTS 9,526,112 B2 * 12/2016 Tabet ................ H04W 28/0221
9,955,465 B2 *  4/2018 He ....................... H04L 5/0094
(Continued)

OTHER PUBLICATIONS

International Search Report and Written Opinion—PCT/US2021/023206—ISA/EPO—dated Sep. 2, 2021.
(Continued)

*Primary Examiner* — Rasheed Gidado
(74) *Attorney, Agent, or Firm* — Harrity & Harrity, LLP

(57) ABSTRACT

Various aspects of the present disclosure generally relate to wireless communication. In some aspects, a user equipment may receive, from a base station, a scheduling downlink control information (DCI) communication that schedules a physical downlink shared channel (PDSCH) transmission, the scheduling DCI including an indication of a resource allocation for a DCI communication, wherein the resource allocation for the DCI communication includes one or more resources included in a resource allocation for the PDSCH transmission, and receive the PDSCH transmission that includes the DCI communication based at least in part on the indication of the resource allocation for the DCI communication. Numerous other aspects are provided.

30 Claims, 7 Drawing Sheets

(51) Int. Cl.
*H04W 72/23* (2023.01)
*H04W 72/50* (2023.01)

(56) References Cited

U.S. PATENT DOCUMENTS

| | | | | |
|---|---|---|---|---|
| 10,951,373 | B2* | 3/2021 | Wang | H04J 11/0079 |
| 2017/0041971 | A1* | 2/2017 | Kim | H04W 76/14 |
| 2017/0230994 | A1* | 8/2017 | You | H04L 5/0053 |
| 2018/0123769 | A1* | 5/2018 | Pelletier | H04L 5/0053 |
| 2018/0199268 | A1* | 7/2018 | Wang | H04L 5/0053 |
| 2019/0053318 | A1* | 2/2019 | Nogami | H04L 5/0044 |
| 2019/0075524 | A1* | 3/2019 | Zhou | H04W 72/046 |
| 2020/0213036 | A1* | 7/2020 | Shen | H04L 5/0091 |
| 2020/0229156 | A1* | 7/2020 | Park | H04W 72/042 |
| 2020/0296758 | A1* | 9/2020 | Li | H04L 5/001 |
| 2021/0259005 | A1* | 8/2021 | Yoshioka | H04L 1/0068 |
| 2021/0274521 | A1* | 9/2021 | Yuan | H04L 1/0038 |
| 2021/0329685 | A1* | 10/2021 | Matsumura | H04L 5/0094 |

OTHER PUBLICATIONS

Partial International Search Report—PCT/US2021/023206—ISA/EPO—dated Jul. 5, 2021.
Qualcomm: "E-mail Discussions on 2-Stage DCI for NR", 3GPP Draft, TSG-RAN WG1 #88, R1-1702629 E-mail Discussions on 2-Stage DCI for NR, 3rd Generation Partnership Project (3GPP), Mobile Competence Centre, 650, Route Des Lucioles, F-06921, Sophia-Antipolis Cedex, France, vol. RAN WG1. No. Athens, Greece, Feb. 13, 2017-Feb. 17, 2017, Feb. 15, 2017, (Feb. 15, 2017), XP051222023, 12 pages, Retrieved from the Internet: URL: http://www.3gpp.org/ftp/tsg_ran/WG1_RL1/TSGR1_88/Docs/ [retrieved on Feb. 15, 2017], Sections 1, 3, 4, Sections 2 and 4.1, section 3, paragraph [04.1].
Qualcomm Incorporated: "PDCCH Monitoring Enhancements," 3GPP Draft, 3GPP TSG-RAN WG1 #104-e, R1-2101454, 3rd Generation Partnership Project (3GPP), Mobile Competence Centre, 650, Route Des Lucioles, F-06921, Sophia-Antipolis Cedex, France, vol. RAN WG1. No. e-Meeting, Jan. 25, 2021-Feb. 5, 2021, Jan. 19, 2021 (Jan. 19, 2021), XP051971619, pp. 1-4, Retrieved from the Internet: URL: https://ftp.3gpp.org/tsg_ran/WG1_RL1/TSGR1_104-e/Docs/R1-2101454.zip R1-2101454_8.2.2_PDCCH monitoring enhancement.docx [retrieved on Jan. 19, 2021] section 2.3.2, figure 1.
Qualcomm Incorporated: "Remaining Issues on BWP," 3GPP Draft, 3GPP TSG RAN WG1 Meeting #92bis, R1-1804809, Remaining Issues on BWP, 3rd Generation Partnership Project (3GPP), Mobile Competence Centre, 650, Route Des Lucioles, F-06921, Sophia-Antipolis Cedex, France, vol. RAN WG1. No. Sanya, China, Apr. 16, 2018-Apr. 20, 2018, Apr. 7, 2018 (Apr. 7, 2018), XP051414165, pp. 1-18, Retrieved from the Internet: URL: http://www.3gpp.org/ftp/tsg%5Fran/WG1%5FRL1/TSGR1%5F92b/Docs/ [retrieved on Apr. 7, 2018] section 2.1.5.

* cited by examiner

| Row Index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| ... | ... | ... | ... | ... | ... |
| 9 | 2, 3 | Type B | 0 | 5 | 2 |
| ... | ... | ... | ... | ... | ... |

405 PDSCH TDRA Table

RESOURCE ALLOCATION FOR PIGGYBACK DOWNLINK CONTROL INFORMATION

CROSS-REFERENCE TO RELATED APPLICATION

This patent application claims priority to U.S. Provisional Patent Application No. 63/018,317, filed on Apr. 30, 2020, entitled "RESOURCE ALLOCATION FOR PIGGYBACK DOWNLINK CONTROL INFORMATION" and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for resource allocation for piggyback downlink control information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, a scheduling downlink control information (DCI) communication that schedules a physical downlink shared channel (PDSCH) transmission, the scheduling DCI including an indication of a resource allocation for a DCI communication, wherein the resource allocation for the DCI communication includes one or more resources included in a resource allocation for the PDSCH transmission; and receiving the PDSCH transmission that includes the DCI communication based at least in part on the indication of the resource allocation for the DCI communication.

In some aspects, a method of wireless communication, performed by a base station, may include determining a resource allocation for a DCI communication, wherein the resource allocation for the DCI communication includes one or more resources of a set of resources allocated for a PDSCH transmission; and transmitting, to a UE, a scheduling DCI communication that schedules the PDSCH transmission, the scheduling DCI including an indication of the resource allocation for the DCI communication.

In some aspects, a UE for wireless communication may include a memory and one or more processors operatively coupled to the memory. The memory and the one or more processors may be configured to receive, from a base station, a scheduling DCI communication that schedules a PDSCH transmission, the scheduling DCI including an indication of a resource allocation for a DCI communication, wherein the resource allocation for the DCI communication includes one or more resources included in a resource allocation for the PDSCH transmission; and receive the PDSCH transmission that includes the DCI communication based at least in part on the indication of the resource allocation for the DCI communication.

In some aspects, a base station for wireless communication may include a memory and one or more processors operatively coupled to the memory. The memory and the one or more processors may be configured to determine a resource allocation for a DCI communication, wherein the resource allocation for the DCI communication includes one or more resources of a set of resources allocated for a PDSCH transmission; and transmit, to a UE, a scheduling DCI communication that schedules the PDSCH transmission, the scheduling DCI including an indication of the resource allocation for the DCI communication.

In some aspects, a non-transitory computer-readable medium may store one or more instructions for wireless communication. The one or more instructions, when executed by one or more processors of a UE, may cause the one or more processors to receive, from a base station, a scheduling DCI communication that schedules a PDSCH transmission, the scheduling DCI including an indication of a resource allocation for a DCI communication, wherein the resource allocation for the DCI communication includes one or more resources included in a resource allocation for the PDSCH transmission; and receive the PDSCH transmission that includes the DCI communication based at least in part on the indication of the resource allocation for the DCI communication.

In some aspects, a non-transitory computer-readable medium may store one or more instructions for wireless communication. The one or more instructions, when executed by one or more processors of a base station, may cause the one or more processors to determine a resource allocation for a DCI communication, wherein the resource allocation for the DCI communication includes one or more resources of a set of resources allocated for a PDSCH transmission; and transmit, to a UE, a scheduling DCI communication that schedules the PDSCH transmission, the scheduling DCI including an indication of the resource allocation for the DCI communication.

In some aspects, an apparatus for wireless communication may include means for receiving, from a base station, a scheduling DCI communication that schedules a PDSCH transmission, the scheduling DCI including an indication of a resource allocation for a DCI communication, wherein the resource allocation for the DCI communication includes one or more resources included in a resource allocation for the PDSCH transmission; and means for receiving the PDSCH transmission that includes the DCI communication based at least in part on the indication of the resource allocation for the DCI communication.

In some aspects, an apparatus for wireless communication may include means for determining a resource allocation for a DCI communication, wherein the resource allocation for the DCI communication includes one or more resources of a set of resources allocated for a PDSCH transmission; and means for transmitting, to a UE, a scheduling DCI communication that schedules the PDSCH transmission, the scheduling DCI including an indication of the resource allocation for the DCI communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
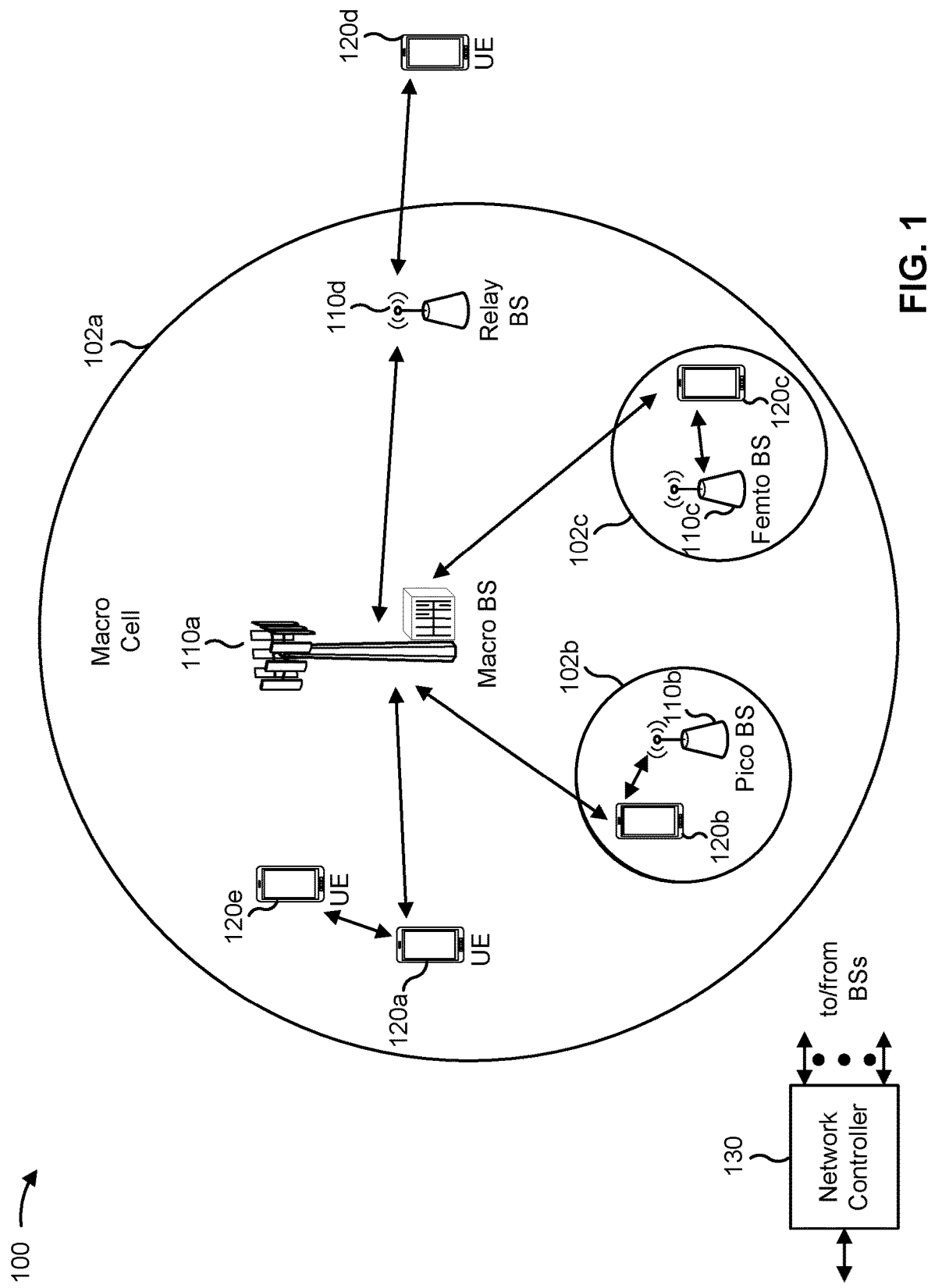
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
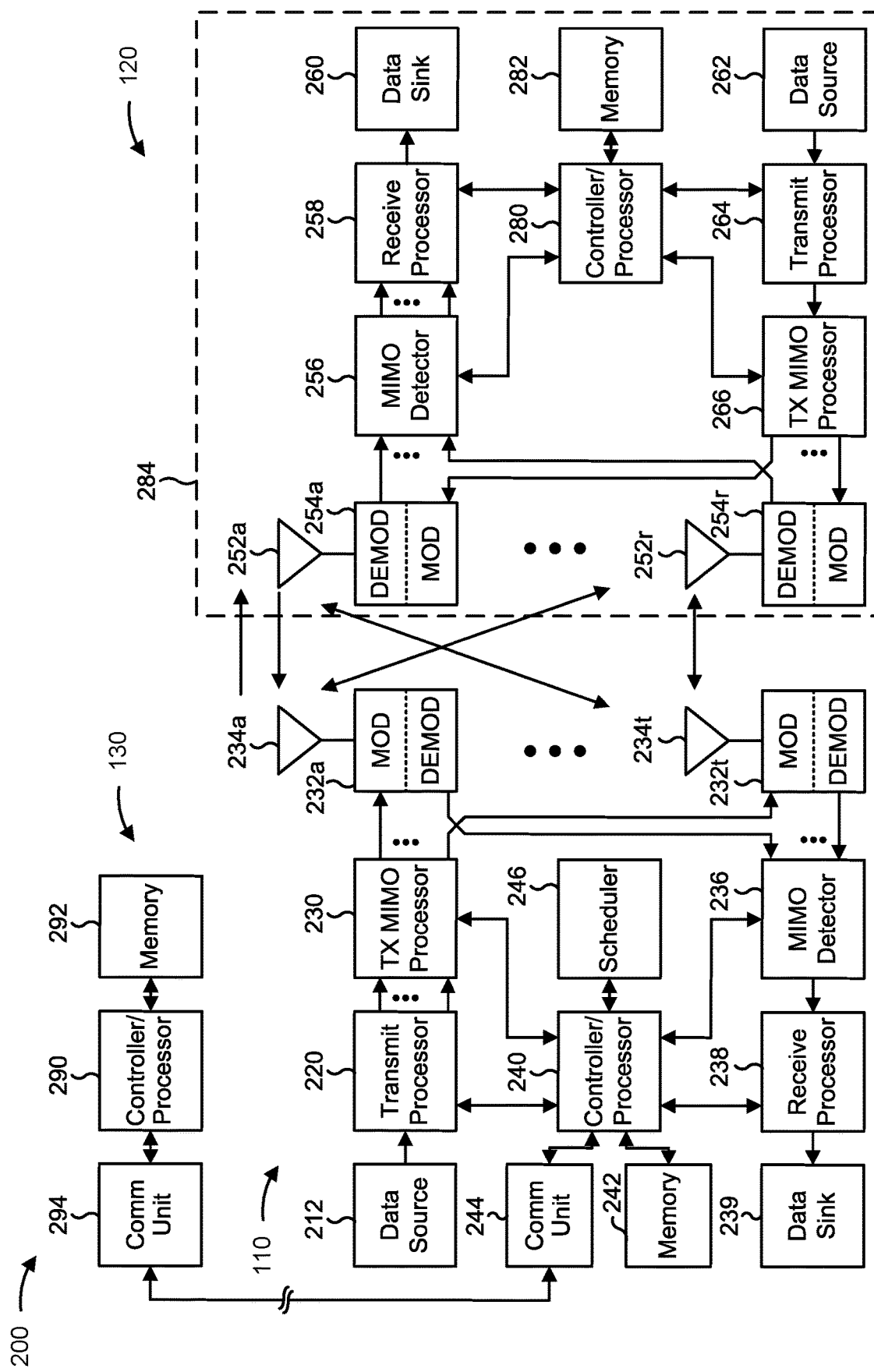
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with resource allocation for piggyback downlink control information, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving, from a base station, a scheduling downlink control information (DCI) communication that schedules a physical downlink shared channel (PDSCH) transmission, the scheduling DCI including an indication of a resource allocation for a DCI communication, wherein the resource allocation for the DCI communication includes one or more resources included in a resource allocation for the PDSCH transmission, and/or means for receiving the PDSCH transmission that includes the DCI communication based at least in part on the indication of the resource allocation for the DCI communication. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for determining a resource allocation for a DCI communication, wherein the resource allocation for the DCI communication includes one or more resources of a set of resources allocated for a PDSCH transmission, and/or means for transmitting, to a UE, a scheduling DCI communication that schedules the PDSCH transmission, the scheduling DCI including an indication of the resource allocation for the DCI communication. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
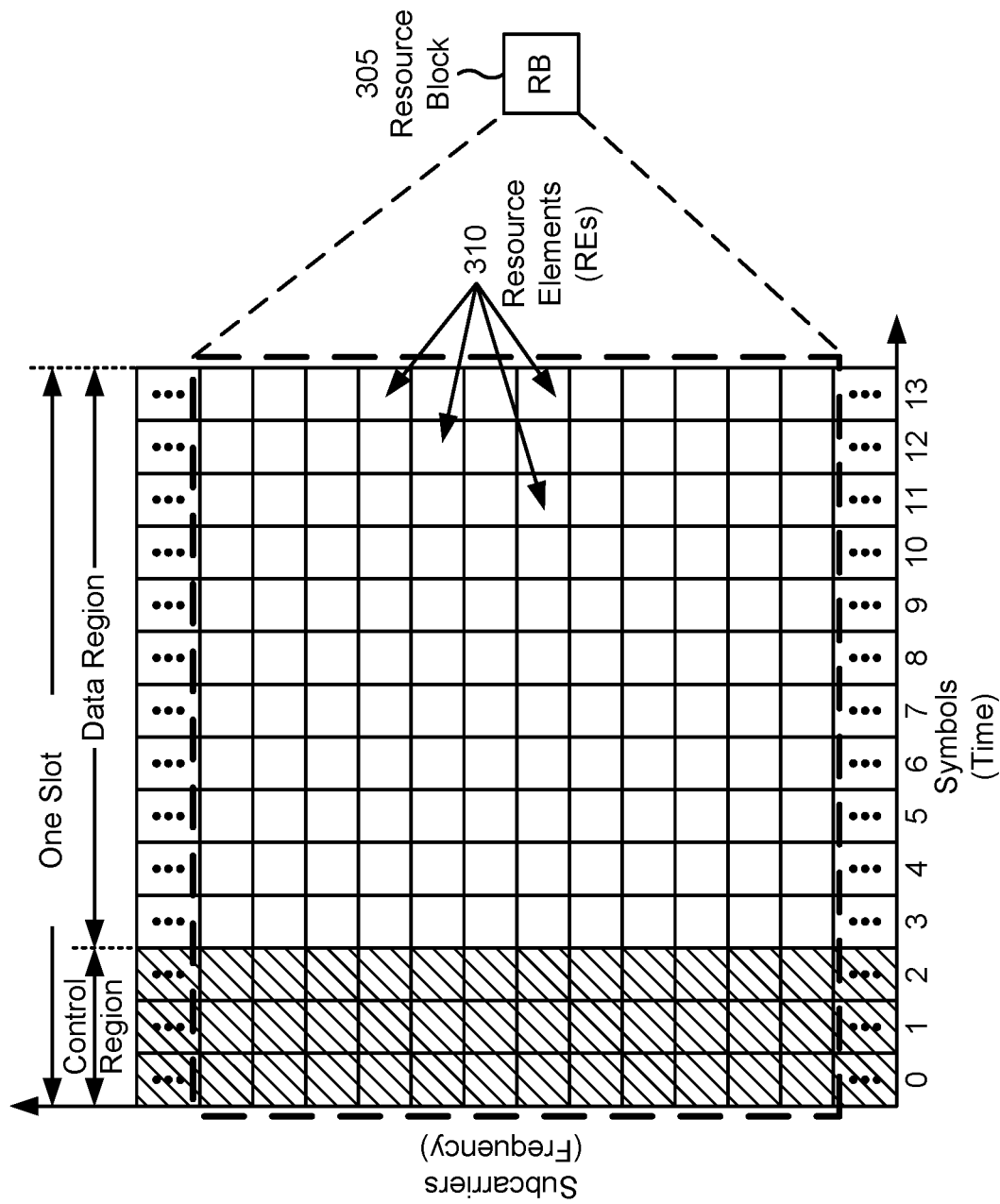
FIG. 3 is a diagram illustrating an example of a slot format, in accordance with the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value. As described herein, an RB 305 may refer to a frequency domain resource (e.g., rather than a frequency resource and time domain resource). That is, an RB 305 may include a set of REs 310 in the frequency domain (e.g., 12 REs or another number of REs) without a time domain restriction. A slot may include 14 symbols in the time domain (e.g., or 12 symbols in an extended cyclic prefix format).

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a symbol duration. A radio frame may include a number of slots related to a subcarrier spacing, such as 40 slots, and may have a length of 10 milliseconds (ms). Consequently, if there are 40 slots in the radio frame, each slot may have a length of 0.25 ms. However, a slot length may vary depending on a numerology used to communicate (e.g., a subcarrier spacing, and/or a cyclic prefix format). A slot may be configured with a link direction (e.g., downlink or uplink) for transmission. In some aspects, the link direction for a slot may be dynamically configured.

As indicated above, FIG. 3 is provided as an example. Other examples may differ from what is described with respect to FIG. 3.

Figure 4:
FIG. 4 is a diagram illustrating an example of time domain resource assignments, in accordance with the present disclosure.

FIG. 4 is a diagram illustrating an example 400 of time domain resource assignments, in accordance with the present disclosure. FIG. 4 shows an example downlink time domain resource assignment (TDRA) table 405. The downlink TDRA table 405 may be, for example, a physical downlink shared channel (PDSCH) TDRA table. In some aspects, the base station 110 and the UE 120 may use different TDRA tables than the table shown in FIG. 4, such as for different configurations, different cells, and/or different sub-carrier spacings of cells, among other examples.

When scheduling a communication, a base station 110 may transmit DCI that indicates a TDRA for the communication. For example, the DCI may include a TDRA field that includes a TDRA index value. The TDRA index value may indicate a row index of a corresponding TDRA table, and the row index may correspond to a set of TDRA parameters (sometimes referred to as scheduling parameters or scheduling information). The base station 110 and the UE 120 may use those TDRA parameters for the scheduled communications. In the example shown in FIG. 4, a TDRA index value of m in the DCI may correspond to a row index of m+1 in the TDRA table. For example, a TDRA index value of 0 may correspond to a row index of 1.

For a downlink communication (e.g., a PDSCH communication), the TDRA parameters may include, for example, a $K_0$ value, an S value, and an L value. The $K_0$ value may represent a scheduling offset (e.g., in number of slots) between the slot containing the scheduling DCI (that schedules the PDSCH communication) and the slot containing the scheduled PDSCH communication (scheduled by the scheduling DCI). The S value may represent a starting symbol for the PDSCH communication in the indicated slot. The L value may represent a length (e.g., a number of consecutive symbols) of the PDSCH communication (e.g., in the indicated slot). In some aspects, the same row index value may correspond to a different set of TDRA parameters depending on a Type A demodulation reference signal (DMRS) position (e.g., a symbol within a resource block that contains the DMRS), and/or a PDSCH mapping type (e.g., indicating a starting symbol of the DMRS, a length of the DMRS, and/or whether slot-based scheduling or mini-slot-based scheduling is used), among other examples.

As indicated above, FIG. 4 is provided as an example. Other examples may differ from what is described with respect to FIG. 4.

In some wireless networks, DCI is provided on a physical downlink control channel (PDCCH) transmission using a control resource set (CORESET). For example, the PDCCH may be provided separately from a PDSCH transmission. A UE may monitor for a PDCCH on a PDCCH monitoring occasion. However, monitoring a PDCCH monitoring occasion may lead to power consumption at the UE and may involve some resource overhead. For example, in higher bands, such as the 60 GHz band, there may be a larger number of PDCCH monitoring occasions in a given length of time due to the shorter slot duration, leading to a proportionately higher PDCCH monitoring load for a given UE (e.g., due to the UE performing multiple blind decodings in search spaces). As another example, in higher bands, a single UE is likely to receive DCI more frequently than in a lower band, particularly for bursty traffic.

In some cases, DCI may be provided within a PDSCH. DCI that is provided within a PDSCH may be referred to as "piggyback DCI" or "piggybacked DCI." A piggyback DCI may include one or more DCI communications. For example, in some aspects, a piggyback DCI may include multiple DCI communications. The multiple DCI communications in the piggyback DCI may be encoded (e.g., by the base station) separately or together. Providing the DCI within the PDSCH transmission may reduce the PDCCH monitoring requirements on the UE, thereby reducing power consumption and PDCCH monitoring overhead. This may be particularly beneficial in higher bands, such as the 60 GHz band. Piggybacked DCI may be particularly advantageous for reduced capability NR devices, such as reduced capability (RedCap) UEs, Internet of Things (IoT) UEs, and/or machine-type communication UEs, among other examples. However, the UE may have problems receiving the piggyback DCI (e.g., may not receive the piggyback DCI, and/or may not properly process the DCI) based at least in part on not knowing (e.g., being unaware of) which resources within the PDSCH transmission are allocated for the DCI.

Some techniques and apparatuses described herein provide for flexible resource allocation for piggybacked DCIs. For example, resource allocation information for a piggyback DCI may be included in a scheduling DCI (e.g., transmitted using the CORESET) that schedules the PDSCH transmission carrying the piggyback DCI. Some techniques and apparatuses described herein enable a base station to flexibly allocate resources (e.g., time domain resources and/or frequency domain resources) for the piggyback DCI and indicate the resource allocation to the UE in the scheduling DCI. This may reduce power consumption of the UE and PDCCH monitoring overhead associated with receiving the PDCCH transmission using CORESET.

Figure 5:
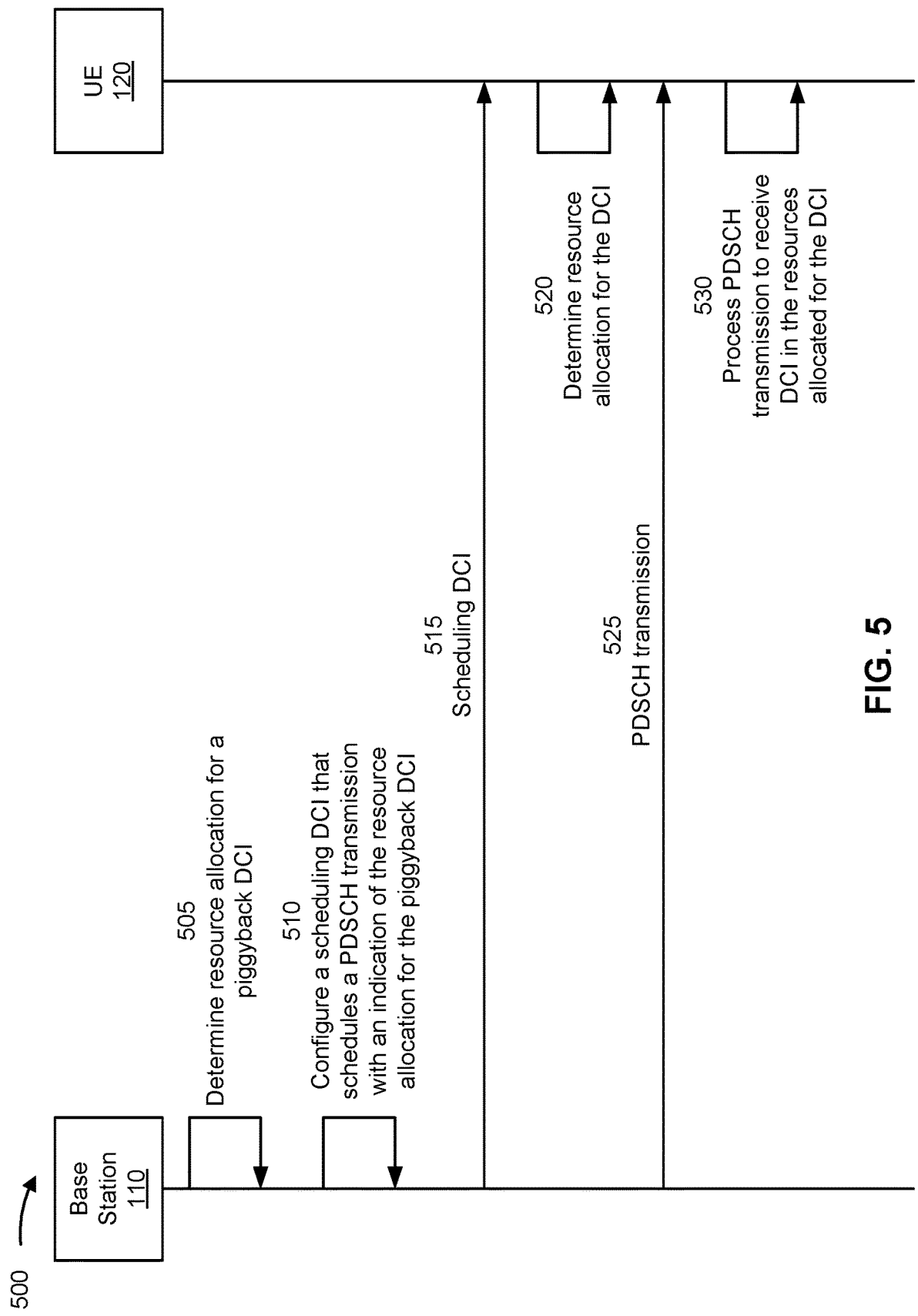
FIG. 5 is a diagram illustrating an example of resource allocation for piggyback downlink control information, in accordance with the present disclosure.

FIG. 5 is a diagram illustrating an example 500 of resource allocation for piggyback DCI, in accordance with the present disclosure. As shown in FIG. 5, a base station 110 and a UE 120 may communicate with one another in a wireless network (e.g., wireless network 100).

As show by reference number 505, the base station 110 may determine a resource allocation for a piggyback DCI (e.g., determine a resource allocation for a DCI communication, where the DCI communication is provided within a PDSCH transmission). The base station 110 may determine a time domain resource allocation for the piggyback DCI. The base station 110 may determine a frequency domain resource allocation for the piggyback DCI.

The base station 110 may determine the time domain resource allocation for the piggyback DCI based at least in part on one or more formats. For example, in a first format, the base station 110 may determine a quantity of symbols (e.g., OFDM symbols) allocated for the piggyback DCI within a time domain resource allocation for the PDSCH transmission, where a first symbol of the quantity of symbols allocated for the piggyback DCI is a first symbol of the time domain resource allocation for the PDSCH transmission. For example, the base station 110 may determine that a time domain resource allocation for the PDSCH transmission is symbols 4 through 10 of a slot. The base station 110 may determine that a first symbol of the quantity of symbols allocated for the piggyback DCI should be symbol 4. For example, if the base station 110 determines that 3 symbols should be allocated for the piggyback DCI, the base station 110 may determine that the first symbol of the 3 symbols should be symbol 4. In some aspects, the symbols allocated for the piggyback DCI may be contiguous (e.g., symbols 4 through 6, if 3 symbols are allocated for the DCI communication). In some aspects, the symbols allocated for the piggyback DCI may not be contiguous (e.g., symbol 4, symbol 6, and symbol 7, if 3 symbols are allocated for the DCI communication). For example, a reference signal, such as a DMRS, may be in symbol 5 of the PDSCH transmission. The symbols allocated for the piggyback DCI may skip symbol 5 based at least in part on the reference signal occupying symbol 5 (e.g., the symbols allocated for the piggyback DCI may be symbol 4, symbol 6, and symbol 7, if 3 symbols are allocated for the DCI communication).

Allocating the quantity of symbols for the piggyback DCI starting with the first symbol of the PDSCH resource allocation may improve the reliability of the piggyback DCI based at least in part on the proximity to a front-loaded demodulation reference signal (DMRS) of the PDSCH transmission. Additionally, front loading the quantity of symbols for the piggyback DCI enables early decoding of the piggyback DCI, allowing the UE more time (e.g., providing more time for the UE) to make decisions that are based at least in part on the piggyback DCI.

In a second format, the base station 110 may determine a quantity of symbols allocated for a DMRS within a time domain resource allocation for the PDSCH transmission. The base station 110 may determine a quantity of symbols allocated for the piggyback DCI within the time domain resource allocation for the PDSCH transmission, where a first symbol of the quantity of symbols allocated for the piggyback DCI is a next symbol after a last symbol of the quantity of symbols allocated for the DMRS. For example, the base station 110 may determine that the time domain resource allocation for the PDSCH transmission is symbols 4 through 10 of a slot and that a DMRS is allocated symbols 4 and 5. The base station 110 may determine that a first symbol of the quantity of symbols allocated for the piggyback DCI should be symbol 6. As discussed above with respect to the first format, the symbols allocated for the piggyback DCI may be contiguous or not contiguous. Allocating the quantity of symbols for the piggyback DCI to start after a last symbol of the DMRS in the PDSCH transmission may improve the reliability of the piggyback DCI by ensuring proximity to the DMRS to allow for reliable decoding of the piggyback DCI.

In a third format, the base station 110 may determine a quantity of symbols allocated for the piggyback DCI within a time domain resource allocation for the PDSCH transmission, where a last symbol of the quantity of symbols allocated for the piggyback DCI is a last symbol of the time domain resource allocation for the PDSCH transmission. For example, the base station 110 may determine that the time domain resource allocation for the PDSCH transmission is symbols 4 through 10 of a slot. The base station 110 may determine that a last symbol of the quantity of symbols allocated for the piggyback DCI should be symbol 10. As discussed above with respect to the first format and the second format, the symbols allocated for the piggyback DCI may be contiguous or not contiguous.

Allocating the quantity of symbols for the piggyback DCI ending with the last symbol of the PDSCH resource allocation may allow for more time for the base station 110 to make scheduling decisions for upcoming PDSCH transmissions that are indicated in the piggyback DCI. For example, during the PDSCH transmission that carries the piggyback DCI, the base station 110 may receive a communication that causes the base station 110 to schedule a PDSCH transmission. By back-loading the quantity of symbols for the piggyback DCI, the base station 110 may be able to include the scheduling information in the piggyback DCI, rather than in a later DCI. This may conserve resources (e.g., time resources, frequency resources, and/or spatial resources) that would have otherwise been used configuring and/or transmitting the later DCI.

The base station 110 may determine the frequency domain resource allocation for the piggyback DCI by determining a frequency density value associated with the frequency domain resource allocation for the DCI communication. The frequency density value may indicate a quantity of resource elements (REs) per resource block (RB) allocated for the PDSCH transmission. For example, an RB may include 12 REs in a symbol. The PDSCH transmission may be allocated 3 RBs. The frequency density value may indicate the quantity of the 12 REs that are allocated for the piggyback DCI in each of the 3 RBs. In some aspects, the piggyback DCI may be allocated frequency domain resources in all of the RBs allocated for the PDSCH transmission (e.g., in the symbols allocated for the piggyback DCI).

In some aspects, the base station 110 may determine the frequency density based at least in part on all possible frequency density values. The quantity of possible frequency density values may be based at least in part on a total quantity of resource elements per resource block (e.g., if there are 12 REs per RB, then the quantity of possible frequency density values may be 12). Therefore, the base station 110 may determine that the frequency density may range from 1 RE per RB to all REs per RB.

In some aspects, the base station 110 may determine the frequency density based at least in part on a subset of all possible frequency density values. For example, if there are 12 REs per RB (e.g., indicating 12 possible frequency density values), the base station 110 may determine the frequency density from a subset of frequency density values that includes less than 12 total values (e.g., the subset of frequency density values may be 1, 2, 3, 4, 6, 8, 10, and 12).

The frequency density value may indicate a maximum quantity of REs per RB allocated for the piggyback DCI. For example, if the frequency density value is 8, the maximum quantity of REs per RB allocated for the piggyback DCI may be 8 REs. The quantity of REs per RB allocated for the piggyback DCI may be reduced based on a quantity of REs available in each RB for each symbol allocated for the piggyback DCI in the time domain of the PDSCH transmission. For example, an RB of the PDSCH transmission may include REs allocated for higher priority signals (e.g., a DMRS, a channel state information reference signal (CSI-RS), and/or a phase tracking reference signal (PTRS)). REs allocated for higher priority signals may not be available to be allocated to the piggyback DCI. As a result, the quantity of REs allocated for the piggyback DCI in the RB may be reduced from the quantity indicated by the frequency density value based at least in part on the quantity of available REs in the RB (e.g., if the frequency density value indicates 10 REs are to be allocated for the piggyback DCI in an RB, but the RB only has 8 available REs, the quantity of REs allocated for the piggyback DCI in that RB may be 8). The determination of whether to reduce the quantity of REs allocated for the piggyback DCI from the quantity of REs indicated by the frequency density value may be made on a per RB basis for each symbol allocated for the piggyback DCI in the time domain. The determination of whether to reduce the quantity of REs allocated for the piggyback DCI from the quantity of REs indicated by the frequency density value may not alter or change the frequency density value indicated in a scheduling DCI.

In some aspects, the base station 110 may determine the frequency domain resource allocation for the piggyback DCI based at least in part on comparing the quantity of REs indicated by the frequency density value to the quantity of available REs in each RB allocated for the PDSCH transmission. The base station 110 may allocate the lesser quantity of REs (e.g., of the REs indicated by the frequency density value and the available REs) in each RB for each symbol allocated for the piggyback DCI in the time domain. As described above, allocating the lesser quantity of REs may not change the frequency density value that is indicated to the UE 120. This may provide for increased frequency diversity of the PDSCH allocation.

The base station 110 may determine a size of the piggyback DCI. For example, the base station 110 may determine a size of the piggyback DCI in a quantity of bytes. The base station 110 may determine a reliability level of the piggyback DCI based at least in part on comparing the size of the piggyback DCI to the quantity of resources allocated for the piggyback DCI. For example, if the base station 110 determines that the size of the piggyback DCI is 40 bytes and determines that 480 REs have been allocated for the piggyback DCI, the base station 110 may determine that the reliability of the piggyback DCI is high. If the base station 110 determines that the size of the piggyback DCI is 100 bytes and determines that 480 REs have been allocated for the piggyback DCI, then the base station 110 may determine that the reliability of the piggyback DCI is low (e.g., based at least in part on the size of the piggyback DCI compared to the quantity of REs allocated for the piggyback DCI). In some aspects, the base station 110 may perform one or more actions based at least in part on determining the reliability of the piggyback DCI. The one or more actions may include scheduling a repetition of the piggyback DCI, transmitting the information included in the piggyback DCI in a later DCI, and/or allocating additional resources for the piggyback DCI in the PDSCH transmission, among other examples.

As shown by reference number 510, the base station 110 may configure a scheduling DCI that schedules the PDSCH transmission with an indication of the resource allocation for the piggyback DCI. The base station 110 may configure one or more bit fields included in the scheduling DCI that indicate the resource allocation for the piggyback DCI. The one or more bit fields may include a DCI time domain resource allocation bit field, a DCI frequency domain resource allocation bit field, a DCI size bit field, a DCI presence bit field, and/or a DCI time domain resource allocation format bit field. The base station 110 may configure the one or more bit fields to indicate a value (e.g., using one or more bits).

The base station 110 may configure the DCI time domain resource allocation bit field to indicate a value that indicates the time domain resource allocation for the piggyback DCI within the allocation for the PDSCH transmission. The DCI time domain resource allocation bit field may be configured with one or more bits. For example, the base station 110 may include a quantity of bits in the DCI time domain resource allocation bit field such that the DCI time domain resource allocation bit field is configured to be capable of indicating all possible values for a quantity of symbols within a slot. For example, if there are 14 symbols within a slot, the DCI time domain resource allocation bit field may include 4 bits (e.g., such that the DCI time domain resource allocation bit field is capable of indicating values corresponding to any quantity of symbols). In some aspects, the base station 110 may include a quantity of bits in the DCI time domain resource allocation bit field such that the DCI time domain resource allocation bit field is configured to be capable of indicating values from a subset of all possible values for a quantity of symbols within a slot. For example, if there are 14 symbols within a slot, the DCI time domain resource allocation bit field may include 3 bits (e.g., to indicate values that may indicate the quantity of symbols, such as 1, 2, 3, 4, 6, 8, 10, and 14 symbols of a slot). As a result, the size of the scheduling DCI may be reduced (e.g., based on the DCI time domain resource allocation bit field including 3 bits rather than 4 bits).

The base station 110 may configure the DCI time domain resource allocation format bit field with a value to indicate a format of the time domain resource allocation. The formats may include the formats discussed above (e.g., the first format, the second format, and the third format) and/or additional time domain resource allocation formats for the piggyback DCI. The time domain resource allocation format bit field may be used by the UE 120 to identify a time-domain location of a piggyback DCI (e.g., starting at a first symbol of the time domain resource allocation for the PDSCH transmission (the first format), starting at a next symbol after a last symbol of the quantity of symbols allocated for a DMRS (the second format), or ending at a last symbol of the time domain resource allocation for the PDSCH transmission).

The base station 110 may configure the DCI frequency domain resource allocation bit field to indicate a value that indicates the frequency domain resource allocation (e.g., the frequency density value) for the piggyback DCI within the allocation for the PDSCH transmission. The DCI frequency domain resource allocation bit field may include one or more bits. For example, the base station 110 may configure the DCI frequency domain resource allocation bit field to include a quantity of bits (e.g., 4 bits) such that the DCI frequency domain resource allocation bit field is configured to be capable of indicating all possible frequency density values. In some aspects, the base station 110 may configure the DCI frequency domain resource allocation bit field to include a quantity of bits (e.g., less than 4 bits) such that the DCI frequency domain resource allocation bit field is configured to be capable of indicating frequency density values from a subset of all possible frequency density values.

The base station 110 may configure the DCI size bit field to indicate the size of the piggyback DCI. The base station 110 may configure the DCI size bit field to include a quantity of bits, such that the DCI size bit field is capable of indicating a value (e.g., in bytes) of the size of the DCI. In some aspects, the base station 110 may configure the DCI size bit field to include a quantity of bits, such that the DCI size bit field is capable of indicating an entry in a table. The table may include one or more entries identifying one or more sizes. For example, a DCI size bit field including 7 bits may be capable of mapping to a table that includes 128 entries (e.g., identifying 128 possible values of the size of the DCI). In some aspects, the base station 110 may configure the DCI size bit field to include a quantity of bits, such that the DCI size bit field is capable of indicating a value for a variable to be used in a formula to calculate the size of the DCI (e.g., the formula may be A+B*(the value indicated by the DCI size bit field), where A and B are fixed values configured by the base station 110). In some aspects, the base station 110 may configure the DCI size bit field to include a quantity of bits, such that the DCI size bit field is capable of indicating a code rate. The code rate may be used (e.g., in connection with the resource allocation for the piggyback DCI and other known settings, such as a modulation order, and/or a number of layers) to determine the size of the piggyback DCI.

The base station 110 may configure the DCI presence bit field to indicate the presence of the piggyback DCI in the PDSCH transmission. In some aspects, the DCI presence bit (e.g., a single bit) may be a piggyback DCI indicator. If the base station 110 configures the DCI presence bit in the scheduling DCI with a value of 1, the value of 1 may indicate the presence of the piggyback DCI in the PDSCH transmission to the UE 120. If the base station 110 configures the DCI presence bit in the scheduling DCI with a value of 0, the value of 0 may indicate that there is not a piggyback DCI in the PDSCH transmission to the UE 120. In this way, the base station 110 may indicate, in the scheduling DCI, to the UE 120 whether the UE 120 needs to monitor for and/or process a piggyback DCI in the PDSCH transmission.

In some aspects, if the base station 110 determines that there is not a piggyback DCI included in the PDSCH transmission, the base station 110 may omit the one or more bit fields described herein from the scheduling DCI and transmit only the DCI presence bit with a value of 0. In some aspects, if the base station 110 determines that there is not a piggyback DCI included in the PDSCH transmission, the base station 110 may use the one or more bit fields described herein for another purpose, such as reserving the one or more bit fields for future use.

As shown by reference number 515, the base station 110 may transmit the scheduling DCI to the UE 120. The base station 110 may transmit the scheduling DCI in a CORESET. The scheduling DCI may schedule the PDSCH transmission (e.g., the scheduling DCI may include a scheduling grant and/or a resource allocation for the PDSCH transmission). The scheduling DCI may be a scheduling DCI (e.g., for a dynamically scheduled PDSCH transmission), and/or an activating DCI (e.g., for a semi-persistent PDSCH transmission), among other examples. The scheduling DCI may include one or more bit fields (e.g., one or more of the bit fields described above) that indicate information (e.g., a resource allocation in the PDSCH transmission, and/or a size) associated with the piggyback DCI included in the PDSCH transmission.

As shown by reference number 520, the UE 120 may determine the resource allocation for the piggyback DCI based at least in part on an indication of the resource allocation included in the scheduling DCI. The indication may be the one or more bit fields included in the scheduling DCI. The UE 120 may identify the one or more bit fields in the scheduling DCI. The UE 120 may determine the resource allocation for the piggyback DCI based at least in part on identifying values of the one or more bit fields in the scheduling DCI.

For example, the UE 120 may receive the scheduling DCI and resource allocation information for the PDSCH transmission as indicated in the scheduling DCI. The UE 120 may identify the value of the DCI presence bit (e.g., 1 or 0, indicating the presence of the piggyback DCI in the PDSCH transmission). In some aspects, if the UE identifies a value of 0 for the DCI presence bit, the UE 120 may ignore one or more other bit fields associated with allocating resources for a piggyback DCI.

The UE 120 may identify a time domain resource allocation for the piggyback DCI (e.g., a quantity of symbols of the symbols and/or an indication of the specific symbol(s) allocated for the piggyback DCI in the symbols allocated for the PDSCH transmission) based at least in part on the value indicated by the DCI time domain resource allocation bit field. The UE 120 may identify a frequency domain resource allocation for the piggyback DCI (e.g., a quantity of REs per RB (e.g., based at least in part on the frequency density value) allocated for the PDSCH transmission) based at least in part on the value indicated by the DCI frequency domain resource allocation bit field. As a result, the UE 120 may determine the resource allocation for the piggyback DCI (e.g., the quantity of REs per RB over the symbols allocated for the piggyback DCI in the PDSCH transmission). The UE 120 may determine a size of the piggyback DCI based at least in part on the value indicated in the DCI size bit field and/or the format of indicating the size of the piggyback DCI, as described above (e.g., table-based, formula-based, and/or code rate-based).

The UE 120 may monitor for the PDSCH transmission and/or the piggyback DCI in the PDSCH transmission based at least in part on determining the resource allocation for the PDSCH transmission and/or the piggyback DCI in the PDSCH transmission. For example, the UE 120 may monitor for the PDSCH transmission in the resources allocated for the PDSCH transmission. The UE 120 may monitor for the piggyback DCI in the resources allocated for the piggyback DCI.

As shown by reference number 525, the base station 110 may transmit the PDSCH transmission that includes the piggyback DCI. The base station 110 may transmit the PDSCH transmission using the resources allocated for the PDSCH transmission. The base station 110 may include the piggyback DCI in the PDSCH transmission in the resources allocated for the piggyback DCI. The UE 120 may receive the PDSCH transmission based at least in part on monitoring for the PDSCH transmission.

As shown by reference number 530, the UE 120 may process (e.g., scan for, monitor for, demodulate, and/or decode) the PDSCH transmission. The UE 120 may process the PDSCH transmission based at least in part on the indication of the resource allocation for the piggyback DCI. For example, the UE 120 may receive the piggyback DCI based at least in part on processing the PDSCH transmission that includes the piggyback DCI. The UE 120 may process the piggyback DCI according to the resource allocation for the piggyback DCI. The UE 120 may identify the piggyback DCI based at least in part on processing the PDSCH transmission and/or the piggyback DCI.

As indicated above, FIG. 5 is provided as an example. Other examples may differ from what is described with respect to FIG. 5.

Figure 6:
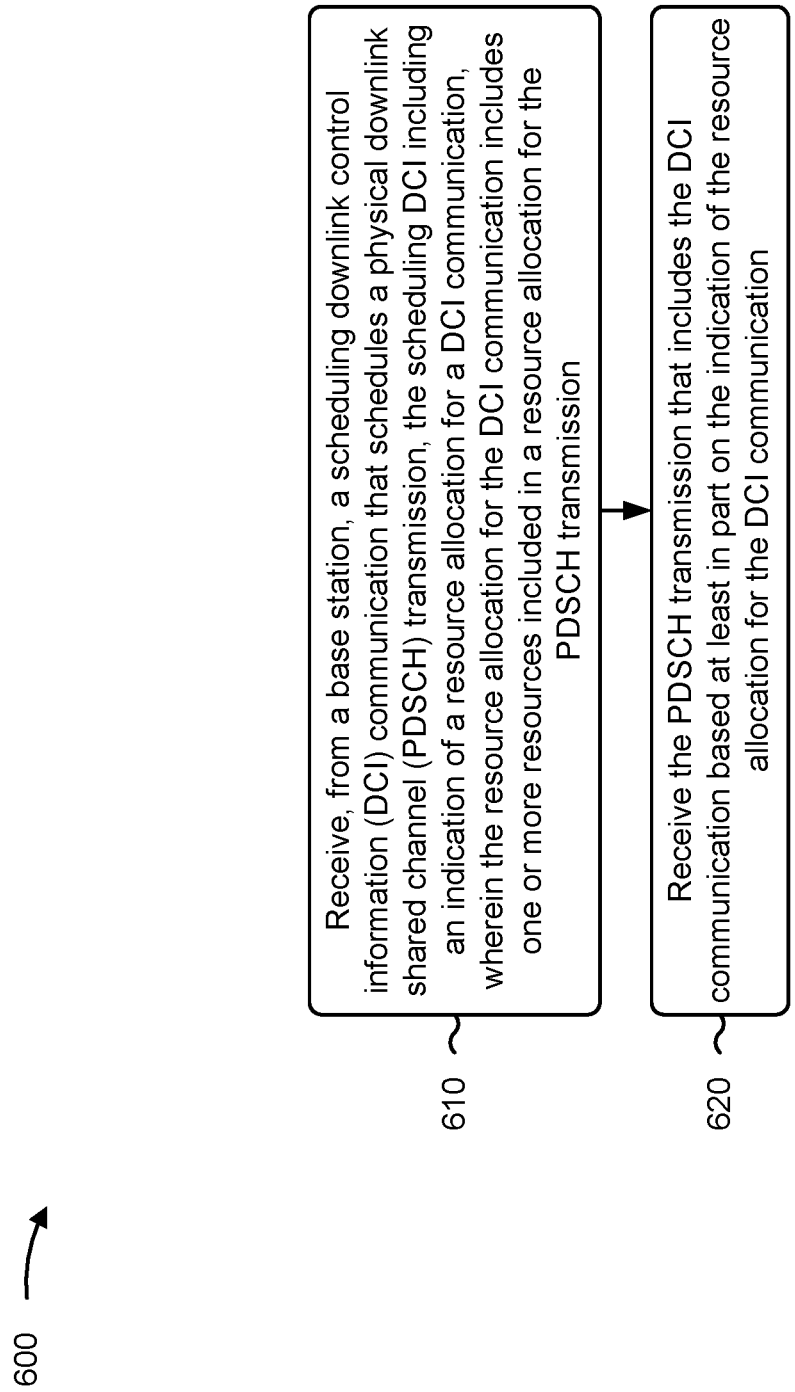
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the user equipment (e.g., UE 120) performs operations associated with resource allocation for piggyback DCI.

As shown in FIG. 6, in some aspects, process 600 may include receiving, from a base station, a scheduling DCI communication that schedules a PDSCH transmission, the scheduling DCI including an indication of a resource allocation for a DCI communication, wherein the resource allocation for the DCI communication includes one or more resources included in a resource allocation for the PDSCH transmission (block 610). For example, the UE (e.g., using receive processor 258, transmit processor 264, controller/processor 280, and/or memory 282) may receive, from a base station, a scheduling DCI communication that schedules a PDSCH transmission, the scheduling DCI including an indication of a resource allocation for a DCI communication, as described above. In some aspects, the resource allocation for the DCI communication includes one or more resources included in a resource allocation for the PDSCH transmission.

As further shown in FIG. 6, in some aspects, process 600 may include receiving the PDSCH transmission that includes the DCI communication based at least in part on the indication of the resource allocation for the DCI communication (block 620). For example, the UE (e.g., using receive processor 258, transmit processor 264, controller/processor 280, and/or memory 282) may receive the PDSCH transmission that includes the DCI communication based at least in part on the indication of the resource allocation for the DCI communication, as described above.

Process 600 may include additional aspects, such as any single aspect or any combination of aspects described below and/or in connection with one or more other processes described elsewhere herein.

In a first aspect, process 600 includes identifying a time domain resource allocation for the DCI communication based at least in part on a DCI time domain resource allocation bit field included in the scheduling DCI, wherein the DCI time domain resource allocation bit field is configured to be capable of indicating a value from a subset of all possible values for a quantity of symbols within a slot.

In a second aspect, alone or in combination with the first aspect, identifying the time domain resource allocation for the DCI communication includes identifying a quantity of symbols allocated for the DCI communication within the time domain resource allocation for the PDSCH transmission, wherein a first symbol of the quantity of symbols allocated for the DCI communication is a first symbol of the time domain resource allocation for the PDSCH transmission.

In a third aspect, alone or in combination with one or more of the first and second aspects, identifying the time domain resource allocation for the DCI communication includes identifying a quantity of symbols allocated for a demodulation reference signal (DMRS) within the time domain resource allocation for the PDSCH transmission, and identifying a quantity of symbols allocated for the DCI communication within the time domain resource allocation for the PDSCH transmission, wherein a first symbol of the quantity of symbols allocated for the DCI communication is a next symbol after a last symbol of the quantity of symbols allocated for the DMRS.

In a fourth aspect, alone or in combination with one or more of the first through third aspects, identifying the time domain resource allocation for the DCI communication includes identifying a quantity of symbols allocated for the DCI communication within the time domain resource allocation for the PDSCH transmission, wherein a last symbol of the quantity of symbols allocated for the DCI communication is a last symbol of the time domain resource allocation for the PDSCH transmission.

In a fifth aspect, alone or in combination with one or more of the first through fourth aspects, identifying the time domain resource allocation for the DCI communication includes identifying a format of the time domain resource allocation for the DCI communication based at least in part on a DCI time domain resource allocation format bit field included in the scheduling DCI.

In a sixth aspect, alone or in combination with one or more of the first through fifth aspects, process 600 includes identifying a frequency domain resource allocation for the DCI communication based at least in part on a DCI frequency domain resource allocation bit field included in the scheduling DCI, wherein the frequency domain resource allocation indicates a maximum quantity of resource elements per resource block allocated for the DCI communication.

In a seventh aspect, alone or in combination with one or more of the first through sixth aspects, the frequency domain resource allocation indicates a frequency density value that is configured to be capable of indicating frequency density values from a subset of all possible frequency density values, wherein a quantity of possible frequency density values is based at least in part on a total quantity of resource elements per resource block.

In an eighth aspect, alone or in combination with one or more of the first through seventh aspects, identifying the frequency domain resource allocation for the DCI communication includes identifying a frequency density value indicating a quantity of resource elements of a resource block allocated for the DCI communication, determining an available quantity of resource elements of the resource block per symbol allocated for the DCI communication, determining that the available quantity of resource elements of the resource block in a symbol is less than the quantity of resource elements of the resource block allocated for the DCI communication indicated by the frequency density value, and determining a new quantity of resource elements of the resource block in the symbol allocated for the DCI communication based at least in part on the available quantity of resource elements of the resource block.

In a ninth aspect, alone or in combination with one or more of the first through eighth aspects, process 600 includes identifying a size of the DCI communication based at least in part on a DCI size bit field included in the scheduling DCI, wherein the size of the DCI communication is indicated in a quantity of bytes.

In a tenth aspect, alone or in combination with one or more of the first through ninth aspects, the size of the DCI communication is determined based at least in part on a table, and the DCI size bit field indicates an entry in the table identifying the size of the DCI communication.

In an eleventh aspect, alone or in combination with one or more of the first through tenth aspects, the DCI size bit field indicates a code rate, and identifying the size of the DCI communication is based at least in part on the code rate.

In a twelfth aspect, alone or in combination with one or more of the first through eleventh aspects, process 600 includes identifying a DCI presence bit, in a scheduling DCI that schedules the PDSCH transmission, indicating a presence of a DCI in the PDSCH transmission, and determining that the PDSCH transmission includes the DCI communication based at least in part on identifying the DCI presence bit.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
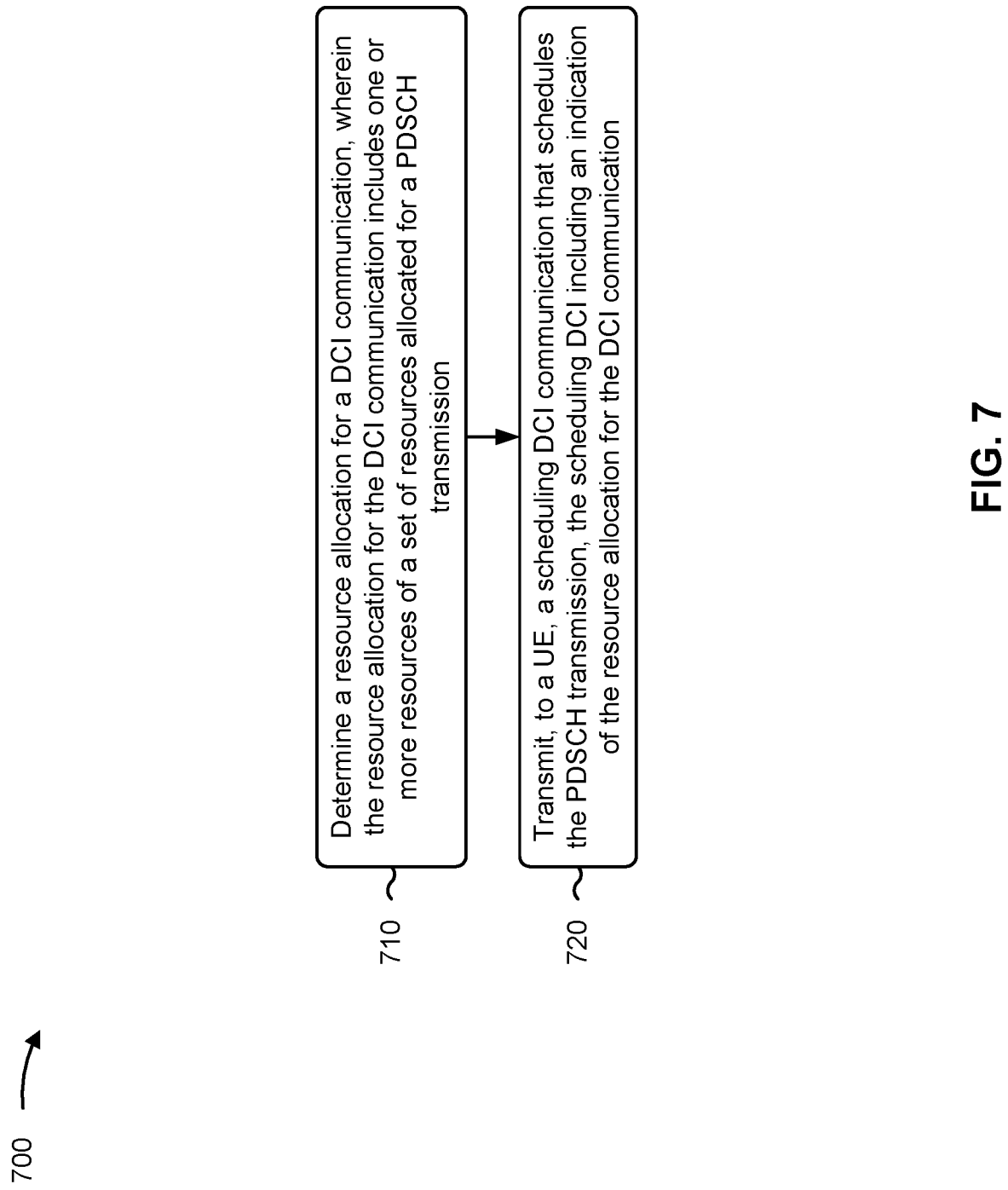
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110) performs operations associated with resource allocation for piggyback DCI.

As shown in FIG. 7, in some aspects, process 700 may include determining a resource allocation for a DCI communication, the resource allocation for the DCI communication includes one or more resources of a set of resources allocated for a PDSCH transmission (block 710). For example, the base station (e.g., using transmit processor 220, receive processor 238, controller/processor 240, and/or memory 242) may determine a resource allocation for a DCI communication, as described above. In some aspects, the resource allocation for the DCI communication includes one or more resources of a set of resources allocated for a PDSCH transmission.

As further shown in FIG. 7, in some aspects, process 700 may include transmitting, to a UE, a scheduling DCI communication that schedules the PDSCH transmission, the scheduling DCI including an indication of the resource allocation for the DCI communication (block 720). For example, the base station (e.g., using transmit processor 220, receive processor 238, controller/processor 240, and/or memory 242) may transmit, to a UE, a scheduling DCI communication that schedules the PDSCH transmission, the scheduling DCI including an indication of the resource allocation for the DCI communication, as described above.

Process 700 may include additional aspects, such as any single aspect or any combination of aspects described below and/or in connection with one or more other processes described elsewhere herein.

In a first aspect, determining the resource allocation for the DCI communication includes determining a time domain resource allocation for the DCI communication, and configuring a DCI time domain resource allocation bit field, in the scheduling DCI, to indicate the time domain resource allocation for the DCI communication, wherein the DCI time domain resource allocation bit field is capable of indicating values from a subset of all possible values for a quantity of symbols within a slot.

In a second aspect, alone or in combination with the first aspect, determining the time domain resource allocation for the DCI communication includes determining a quantity of symbols allocated for the DCI communication within a time domain resource allocation for the PDSCH transmission, wherein a first symbol of the quantity of symbols allocated for the DCI communication is a first symbol of the time domain resource allocation for the PDSCH transmission.

In a third aspect, alone or in combination with one or more of the first and second aspects, determining the time domain resource allocation for the DCI communication includes determining a quantity of symbols allocated for a DMRS within a time domain resource allocation for the PDSCH transmission, and determining a quantity of symbols allocated for the DCI communication within the time domain resource allocation for the PDSCH transmission, wherein a first symbol of the quantity of symbols allocated for the DCI communication is a next symbol after a last symbol of the quantity of symbols allocated for the DMRS.

In a fourth aspect, alone or in combination with one or more of the first through third aspects, determining the time domain resource allocation for the DCI communication includes determining a quantity of symbols allocated for the DCI communication within a time domain resource allocation for the PDSCH transmission, wherein a last symbol of the quantity of symbols allocated for the DCI communication is a last symbol of the time domain resource allocation for the PDSCH transmission.

In a fifth aspect, alone or in combination with one or more of the first through fourth aspects, determining the time domain resource allocation for the DCI communication includes configuring the DCI time domain resource allocation format bit field, in the scheduling DCI, to indicate a format of the time domain resource allocation for the DCI communication.

In a sixth aspect, alone or in combination with one or more of the first through fifth aspects, process 700 includes determining a frequency domain resource allocation for the DCI communication, the frequency domain resource allocation indicating a frequency density value associated with the frequency domain resource allocation for the DCI communication, wherein the frequency density value indicates maximum a quantity of resource elements per resource block allocated for the PDSCH transmission, and configuring a DCI frequency domain resource allocation bit field, in the scheduling DCI, to indicate the frequency domain resource allocation for the DCI communication.

In a seventh aspect, alone or in combination with one or more of the first through sixth aspects, process 700 includes configuring the DCI frequency domain resource allocation bit field to be capable of indicating frequency density values from a subset of all possible frequency density values, wherein a quantity of possible frequency density values is based at least in part on a total quantity of resource elements per resource block.

In an eighth aspect, alone or in combination with one or more of the first through seventh aspects, determining the frequency domain resource allocation for the DCI communication includes determining a frequency density value indicating a quantity of resource elements of a resource block allocated for the DCI communication, determining an available quantity of resource elements of the resource block per symbol allocated to the DCI communication, determining that the available quantity of resource elements of the resource block in a symbol is less than the quantity of resource elements of the resource block allocated for the DCI communication indicated by the frequency density value, and determining a new quantity of resource elements of the resource block in the symbol allocated for the DCI communication based at least in part on the available quantity of resource elements of the resource block.

In a ninth aspect, alone or in combination with one or more of the first through eighth aspects, process 700 includes determining a size of the DCI communication, and configuring a DCI size bit field, in the scheduling DCI, to indicate the size of the DCI communication, wherein the size of the DCI communication is indicated in a quantity of bytes.

In a tenth aspect, alone or in combination with one or more of the first through ninth aspects, the size of the DCI communication is determined by the UE based at least in part on a table, and the DCI size bit field indicates an entry in the table identifying the size of the DCI communication.

In an eleventh aspect, alone or in combination with one or more of the first through tenth aspects, the size of the DCI communication is determined by the UE based at least in part on a code rate, and the DCI size bit field indicates the code rate.

In a twelfth aspect, alone or in combination with one or more of the first through eleventh aspects, process 700 includes configuring a DCI presence bit, in the scheduling DCI that schedules the PDSCH transmission, indicating a presence of the DCI communication in the scheduling PDSCH transmission, and transmitting, to the UE, the scheduling DCI including the DCI presence bit indicating the presence of the DCI communication in the PDSCH transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: receiving, from a base station, an indication of a resource allocation for a downlink control information (DCI) communication, wherein the DCI communication is provided within a physical downlink shared channel (PDSCH) transmission; and processing the PDSCH transmission based at least in part on the indication of the resource allocation for the DCI communication.

Aspect 2: The method of Aspect 1, further comprising: receiving, from the base station, a scheduling DCI communication in a control resource set, wherein the scheduling DCI communication schedules the PDSCH transmission; and identifying the indication of the resource allocation for the DCI communication in the scheduling DCI communication.

Aspect 3: The method of Aspect 2, further comprising: identifying one or more bit fields included in the scheduling DCI communication, wherein the one or more bit fields indicate the resource allocation for the DCI communication.

Aspect 4: The method of Aspect 3, wherein the one or more bit fields include at least one of: a DCI time domain resource allocation bit field, a DCI frequency domain resource allocation bit field, a DCI size bit field, a DCI presence bit field, a DCI time domain resource allocation format bit field, or a combination thereof.

Aspect 5: The method of any of Aspects 1-4, wherein the indication of the resource allocation for the DCI communication indicates one or more resources included in a resource allocation for the PDSCH transmission.

Aspect 6: The method of any of Aspects 1-5, further comprising: identifying a time domain resource allocation for the DCI communication based at least in part on the indication of the resource allocation for the DCI communication.

Aspect 7: The method of Aspect 6, wherein identifying the time domain resource allocation for the DCI communication comprises: identifying a quantity of symbols allocated for the DCI communication within a time domain resource allocation for the PDSCH transmission, wherein a first symbol of the quantity of symbols allocated for the DCI communication is a first symbol of the time domain resource allocation for the PDSCH transmission.

Aspect 8: The method of Aspect 6, wherein identifying the time domain resource allocation for the DCI communication comprises: identifying a quantity of symbols allocated for a demodulation reference signal (DMRS) within a time domain resource allocation for the PDSCH transmission; and identifying a quantity of symbols allocated for the DCI communication within the time domain resource allocation for the PDSCH transmission, wherein a first symbol of the quantity of symbols allocated for the DCI communication is a next symbol after a last symbol of the quantity of symbols allocated for the DMRS.

Aspect 9: The method of Aspect 6, wherein identifying the time domain resource allocation for the DCI communication comprises: identifying a quantity of symbols allocated for the DCI communication within a time domain resource allocation for the PDSCH transmission, wherein a last symbol of the quantity of symbols allocated for the DCI communication is a last symbol of the time domain resource allocation for the PDSCH transmission.

Aspect 10: The method of any of Aspects 6-9, wherein identifying the time domain resource allocation for the DCI communication comprises: identifying a DCI time domain resource allocation bit field, in a scheduling DCI that schedules the PDSCH transmission, indicating the time domain resource allocation for the DCI communication.

Aspect 11: The method of Aspect 10, wherein the DCI time domain resource allocation bit field is configured to be capable of indicating all possible values for a quantity of symbols within a slot.

Aspect 12: The method of Aspect 10, wherein the DCI time domain resource allocation bit field is configured to be capable of indicating a value from a subset of all possible values for a quantity of symbols within a slot.

Aspect 13: The method of any of Aspects 6-12, wherein identifying the time domain resource allocation for the DCI communication comprises: identifying a DCI time domain resource allocation format bit field, in a scheduling DCI that schedules the PDSCH transmission, indicating a format of the time domain resource allocation for the DCI communication.

Aspect 14: The method of any of Aspects 6-13, wherein identifying the time domain resource allocation for the DCI communication comprises: identifying a plurality of symbols allocated for the DCI communication within a time domain resource allocation for the PDSCH transmission, wherein the plurality of symbols are not contiguous.

Aspect 15: The method of any of Aspects 1-14, further comprising: identifying a frequency domain resource allocation for the DCI communication based at least in part on the indication of the resource allocation for the DCI communication.

Aspect 16: The method of Aspect 15, wherein identifying the frequency domain resource allocation for the DCI communication comprises: identifying a frequency density value associated with the frequency domain resource allocation for the DCI communication, wherein the frequency density value indicates a quantity of resource elements per resource block allocated for the PDSCH transmission.

Aspect 17: The method of Aspect 16, wherein the frequency density value is configured to be capable of indicating all possible frequency density values.

Aspect 18: The method of Aspect 16, wherein the frequency density value is configured to be capable of indicating frequency density values from a subset of all possible frequency density values, wherein a quantity of possible frequency density values is based at least in part on a total quantity of resource elements per resource block.

Aspect 19: The method of any of Aspects 16-18, wherein the frequency density value indicates a maximum quantity of resource elements per resource block allocated for the DCI communication.

Aspect 20: The method of any of Aspects 15-19, wherein identifying the frequency domain resource allocation for the DCI communication comprises: identifying a DCI frequency domain resource allocation bit field, in a scheduling DCI that schedules the PDSCH transmission, indicating the frequency domain resource allocation for the DCI communication.

Aspect 21: The method of Aspect 20, wherein the DCI frequency domain resource allocation bit field is configured to be capable of indicating all possible frequency density values, wherein a quantity of possible frequency density values is based at least in part on a total quantity of resource elements per resource block.

Aspect 22: The method of Aspect 20, wherein the DCI frequency domain resource allocation bit field is configured to be capable of indicating frequency density values from a subset of all possible frequency density values, wherein a quantity of possible frequency density values is based at least in part on a total quantity of resource elements per resource block.

Aspect 23: The method of any of Aspects 15-22, wherein identifying the frequency domain resource allocation for the DCI communication comprises: identifying a frequency density value indicating a quantity of resource elements of a resource block allocated for the DCI communication; determining an available quantity of resource elements of the resource block per symbol allocated for the DCI communication; determining that the available quantity of resource elements of the resource block in a symbol is less than the quantity of resource elements of the resource block allocated for the DCI communication indicated by the frequency density value; and determining a new quantity of resource elements of the resource block in the symbol allocated for the DCI communication based at least in part on the available quantity of resource elements of the resource block.

Aspect 24: The method of any of Aspects 1-23, further comprising: identifying a size of the DCI communication based at least in part on the indication of the resource allocation for the DCI communication.

Aspect 25: The method of Aspect 24, wherein identifying the size of the DCI communication comprises: identifying a DCI size bit field, in a scheduling DCI that schedules the PDSCH transmission, indicating the size of the DCI communication.

Aspect 26: The method of Aspect 25, wherein the size of the DCI communication is indicated in a quantity of bytes.

Aspect 27: The method of any of Aspects 25-26, wherein the size of the DCI communication is determined based at least in part on a table, and wherein the DCI size bit field indicates an entry in the table identifying the size of the DCI communication.

Aspect 28: The method of any of Aspects 25-26, wherein the size of the DCI communication is determined based at least in part on a formula, and wherein the DCI size bit field indicates a variable to be used in the formula for determining the size of the DCI communication.

Aspect 29: The method of any of Aspects 25-26, wherein the DCI size bit field indicates a code rate, and wherein identifying a size of the DCI communication is based at least in part on the code rate.

Aspect 30: The method of any of Aspects 1-29, further comprising: identifying a DCI presence bit, in a scheduling DCI that schedules the PDSCH transmission, indicating a presence of a DCI in the PDSCH transmission; and determining that the PDSCH transmission includes the DCI communication based at least in part on identifying the DCI presence bit.

Aspect 31: The method of any of Aspects 1-30, further comprising: determining the resource allocation for the DCI communication based at least in part on the indication of the resource allocation for the DCI communication; determining a size of the DCI communication based at least in part on the indication of the resource allocation for the DCI communication; and determining a reliability of the DCI communication based at least in part on the resource allocation for the DCI communication and the size of the DCI communication.

Aspect 32: A method of wireless communication performed by a base station, comprising: determining a resource allocation for a downlink control information (DCI) communication, wherein the DCI communication is provided within a physical downlink shared channel (PDSCH) transmission; and transmitting, to a user equipment (UE), an indication of the resource allocation for the DCI communication.

Aspect 33: The method of Aspect 32, further comprising: transmitting, to the UE, a scheduling DCI communication in a control resource set, wherein the scheduling DCI communication schedules the PDSCH transmission, wherein transmitting the indication of the resource allocation for the DCI communication comprises: transmitting, to the UE, the indication of the resource allocation for the DCI communication in the scheduling DCI communication. wherein transmitting the indication of the resource allocation for the DCI communication comprises: transmitting, to the UE, the indication of the resource allocation for the DCI communication in the scheduling DCI communication.

Aspect 34: The method of Aspect 33, further comprising: configuring one or more bit fields included in the scheduling DCI communication, wherein the one or more bit fields indicate the resource allocation for the DCI communication.

Aspect 35: The method of Aspect 34, wherein the one or more bit fields include at least one of: a DCI time domain resource allocation bit field, a DCI frequency domain resource allocation bit field, a DCI size bit field, a DCI presence bit field, a DCI time domain resource allocation format bit field, or a combination thereof.

Aspect 36: The method of any of Aspects 32-35, further comprising: allocating one or more resources, of a set of resources allocated for the PDSCH transmission, for the DCI communication, wherein the indication of the resource allocation for the DCI communication indicates the one or more resources.

Aspect 37: The method of any of Aspects 32-36, wherein determining the resource allocation for the DCI communication comprises: determining a time domain resource allocation for the DCI communication.

Aspect 38: The method of Aspect 37, wherein determining the time domain resource allocation for the DCI communication comprises: determining a quantity of symbols allocated for the DCI communication within a time domain resource allocation for the PDSCH transmission, wherein a first symbol of the quantity of symbols allocated for the DCI communication is a first symbol of the time domain resource allocation for the PDSCH transmission.

Aspect 39: The method of Aspect 37, wherein determining the time domain resource allocation for the DCI communication comprises: determining a quantity of symbols allocated for a demodulation reference signal (DMRS) within a time domain resource allocation for the PDSCH transmission; and determining a quantity of symbols allocated for the DCI communication within the time domain resource allocation for the PDSCH transmission, wherein a first symbol of the quantity of symbols allocated for the DCI communication is a next symbol after a last symbol of the quantity of symbols allocated for the DMRS.

Aspect 40: The method of Aspect 37, wherein determining the time domain resource allocation for the DCI communication comprises: determining a quantity of symbols allocated for the DCI communication within a time domain resource allocation for the PDSCH transmission, wherein a last symbol of the quantity of symbols allocated for the DCI communication is a last symbol of the time domain resource allocation for the PDSCH transmission.

Aspect 41: The method of any of Aspects 37-40, wherein determining the time domain resource allocation for the DCI communication comprises: configuring a DCI time domain resource allocation bit field, in a scheduling DCI that schedules the PDSCH transmission, indicating the time domain resource allocation for the DCI communication.

Aspect 42: The method of Aspect 41, wherein configuring the DCI time domain resource allocation bit field comprises: configuring the DCI time domain resource allocation bit field to be capable of indicating all possible values for a quantity of symbols within a slot.

Aspect 43: The method of Aspect 41, wherein configuring the DCI time domain resource allocation bit field comprises: configuring the DCI time domain resource allocation bit field to be capable of indicating values from a subset of all possible values for a quantity of symbols within a slot.

Aspect 44: The method of any of Aspects 37-43, wherein determining the time domain resource allocation for the DCI communication comprises: configuring a DCI time domain resource allocation format bit field, in a scheduling DCI that schedules the PDSCH transmission, indicating a format of the time domain resource allocation for the DCI communication.

Aspect 45: The method of any of Aspects 37-44, wherein determining the time domain resource allocation for the DCI communication comprises: determining a plurality of symbols allocated for the DCI communication within a time domain resource allocation for the PDSCH transmission, wherein the plurality of symbols are not contiguous.

Aspect 46: The method of any of Aspects 32-45, further comprising: determining a frequency domain resource allocation for the DCI communication.

Aspect 47: The method of Aspect 46, wherein determining the frequency domain resource allocation for the DCI communication comprises: determining a frequency density value associated with the frequency domain resource allocation for the DCI communication, wherein the frequency density value indicates a quantity of resource elements per resource block allocated for the PDSCH transmission.

Aspect 48: The method of Aspect 47, further comprising: configuring the frequency density value to be capable of indicating all possible frequency density values, wherein a quantity of possible frequency density values is based at least in part on a total quantity of resource elements per resource block.

Aspect 49: The method of Aspect 47, further comprising: configuring the frequency density value to be capable of indicating frequency density values from a subset of all possible frequency density values, wherein a quantity of possible frequency density values is based at least in part on a total quantity of resource elements per resource block.

Aspect 50: The method of any of Aspects 47-49, wherein the frequency density value indicates a maximum quantity of resource elements per resource block allocated for the DCI communication.

Aspect 51: The method of any of Aspects 46-50, wherein determining the frequency domain resource allocation for the DCI communication comprises: configuring a DCI frequency domain resource allocation bit field, in a scheduling DCI that schedules the PDSCH transmission, indicating the frequency domain resource allocation for the DCI communication.

Aspect 52: The method of Aspect 51, wherein configuring the DCI frequency domain resource allocation bit field comprises: configuring the DCI frequency domain resource allocation bit field to be capable of indicating all possible frequency density values, wherein a quantity of possible frequency density values is based at least in part on a total quantity of resource elements per resource block.

Aspect 53: The method of Aspect 51, wherein configuring the DCI frequency domain resource allocation bit field comprises: configuring the DCI frequency domain resource allocation bit field to be capable of indicating frequency density values from a subset of all possible frequency density values, wherein a quantity of possible frequency density values is based at least in part on a total quantity of resource elements per resource block.

Aspect 54: The method of any of Aspects 46-53, wherein determining the frequency domain resource allocation for the DCI communication comprises: determining a frequency density value indicating a quantity of resource elements of a resource block allocated for the DCI communication; determining an available quantity of resource elements of the resource block per symbol allocated to the DCI communication; determining that the available quantity of resource elements of the resource block in a symbol is less than the quantity of resource elements of the resource block allocated for the DCI communication indicated by the frequency density value; and determining a new quantity of resource elements of the resource block in the symbol allocated for the DCI communication based at least in part on the available quantity of resource elements of the resource block.

Aspect 55: The method of any of Aspects 32-54, further comprising: determining a size of the DCI communication.

Aspect 56: The method of Aspect 55, further comprises: configuring a DCI size bit field, in a scheduling DCI that schedules the PDSCH transmission, indicating the size of the DCI communication.

Aspect 57: The method of Aspect 56, wherein the size of the DCI communication is indicated in a quantity of bytes.

Aspect 58: The method of any of Aspects 56-57, wherein the size of the DCI communication is determined based at least in part on a table, and wherein the DCI size bit field indicates an entry in the table identifying the size of the DCI communication.

Aspect 59: The method of any of Aspects 56-57, wherein the size of the DCI communication is determined based at least in part on a formula, and wherein the DCI size bit field indicates a value of a variable to be used in the formula for determining the size of the DCI communication.

Aspect 60: The method of any of Aspects 56-57, wherein the DCI size bit field indicates a code rate, and wherein identifying a size of the DCI communication is based at least in part on the code rate.

Aspect 61: The method of any of Aspects 32-60, further comprising: configuring a DCI presence bit, in a scheduling DCI that schedules the PDSCH transmission, indicating a presence of the DCI communication in the scheduling PDSCH transmission; and transmitting, to the UE, the scheduling DCI including the DCI presence bit indicating the presence of the DCI communication in the PDSCH transmission.

Aspect 62: The method of any of Aspects 32-61, further comprising: determining the resource allocation for the DCI communication; determining a size of the DCI communication; and determining a reliability of the DCI communication based at least in part on the resource allocation for the DCI communication and the size of the DCI communication.

Aspect 63: A method of wireless communication performed by a user equipment (UE), comprising: receiving, from a base station, a scheduling downlink control information (DCI) communication that schedules a physical downlink shared channel (PDSCH) transmission, the scheduling DCI including an indication of a resource allocation for a DCI communication, wherein the resource allocation for the DCI communication includes one or more resources included in a resource allocation for the PDSCH transmission; and receiving the PDSCH transmission that includes the DCI communication based at least in part on the indication of the resource allocation for the DCI communication.

Aspect 64: The method of Aspect 63, further comprising: identifying a time domain resource allocation for the DCI communication based at least in part on a DCI time domain resource allocation bit field included in the scheduling DCI, wherein the DCI time domain resource allocation bit field is configured to be capable of indicating a value from a subset of all possible values for a quantity of symbols within a slot.

Aspect 65: The method of Aspect 64, wherein identifying the time domain resource allocation for the DCI communication comprises: identifying a quantity of symbols allocated for the DCI communication within the time domain resource allocation for the PDSCH transmission, wherein a first symbol of the quantity of symbols allocated for the DCI communication is a first symbol of the time domain resource allocation for the PDSCH transmission.

Aspect 66: The method of Aspect 64, wherein identifying the time domain resource allocation for the DCI communication comprises: identifying a quantity of symbols allocated for a demodulation reference signal (DMRS) within the time domain resource allocation for the PDSCH transmission; and identifying a quantity of symbols allocated for the DCI communication within the time domain resource allocation for the PDSCH transmission, wherein a first symbol of the quantity of symbols allocated for the DCI communication is a next symbol after a last symbol of the quantity of symbols allocated for the DMRS.

Aspect 67: The method of Aspect 64, wherein identifying the time domain resource allocation for the DCI communication comprises: identifying a quantity of symbols allocated for the DCI communication within the time domain resource allocation for the PDSCH transmission, wherein a last symbol of the quantity of symbols allocated for the DCI communication is a last symbol of the time domain resource allocation for the PDSCH transmission.

Aspect 68: The method of any of Aspects 64-67, wherein identifying the time domain resource allocation for the DCI communication comprises: identifying a format of the time domain resource allocation for the DCI communication based at least in part on a DCI time domain resource allocation format bit field included in the scheduling DCI.

Aspect 69: The method of any of Aspects 63-68, further comprising: identifying a frequency domain resource allocation for the DCI communication based at least in part on a DCI frequency domain resource allocation bit field included in the scheduling DCI, wherein the frequency domain resource allocation indicates a maximum quantity of resource elements per resource block allocated for the DCI communication.

Aspect 70: The method of Aspect 69, wherein the frequency domain resource allocation indicates a frequency density value that is configured to be capable of indicating frequency density values from a subset of all possible frequency density values, wherein a quantity of possible frequency density values is based at least in part on a total quantity of resource elements per resource block.

Aspect 71: The method of any of Aspects 69-70, wherein identifying the frequency domain resource allocation for the DCI communication comprises: identifying a frequency density value indicating a quantity of resource elements of a resource block allocated for the DCI communication; determining an available quantity of resource elements of the resource block per symbol allocated for the DCI communication; determining that the available quantity of resource elements of the resource block in a symbol is less than the quantity of resource elements of the resource block allocated for the DCI communication indicated by the frequency density value; and determining a new quantity of resource elements of the resource block in the symbol allocated for the DCI communication based at least in part on the available quantity of resource elements of the resource block.

Aspect 72: The method of any of Aspects 63-71, further comprising: identifying a size of the DCI communication based at least in part on a DCI size bit field included in the scheduling DCI, wherein the size of the DCI communication is indicated in a quantity of bytes.

Aspect 73: The method of any of Aspects 72, wherein the size of the DCI communication is determined based at least in part on a table, and wherein the DCI size bit field indicates an entry in the table identifying the size of the DCI communication.

Aspect 74: The method of any of Aspects 72, wherein the DCI size bit field indicates a code rate, and wherein identifying the size of the DCI communication is based at least in part on the code rate.

Aspect 75: The method of any of Aspects 63-74, further comprising: identifying a DCI presence bit, in a scheduling DCI that schedules the PDSCH transmission, indicating a presence of a DCI in the PDSCH transmission; and determining that the PDSCH transmission includes the DCI communication based at least in part on identifying the DCI presence bit.

Aspect 76: A method of wireless communication performed by a base station, comprising: determining a resource allocation for a downlink control information (DCI) communication, wherein the resource allocation for the DCI communication includes one or more resources of a set of resources allocated for a physical downlink shared channel (PDSCH) transmission; and transmitting, to a user equipment (UE), a scheduling DCI communication that schedules the PDSCH transmission, the scheduling DCI including an indication of the resource allocation for the DCI communication.

Aspect 77: The method of Aspect 76, wherein determining the resource allocation for the DCI communication comprises: determining a time domain resource allocation for the DCI communication; and configuring a DCI time domain resource allocation bit field, in the scheduling DCI, to indicate the time domain resource allocation for the DCI communication, wherein the DCI time domain resource allocation bit field is capable of indicating values from a subset of all possible values for a quantity of symbols within a slot.

Aspect 78: The method of Aspect 77, wherein determining the time domain resource allocation for the DCI communication comprises: determining a quantity of symbols allocated for the DCI communication within a time domain resource allocation for the PDSCH transmission, wherein a first symbol of the quantity of symbols allocated for the DCI communication is a first symbol of the time domain resource allocation for the PDSCH transmission.

Aspect 79: The method of Aspect 77, wherein determining the time domain resource allocation for the DCI communication comprises: determining a quantity of symbols allocated for a demodulation reference signal (DMRS) within a time domain resource allocation for the PDSCH transmission; and determining a quantity of symbols allocated for the DCI communication within the time domain resource allocation for the PDSCH transmission, wherein a first symbol of the quantity of symbols allocated for the DCI communication is a next symbol after a last symbol of the quantity of symbols allocated for the DMRS.

Aspect 80: The method of Aspect 77, wherein determining the time domain resource allocation for the DCI communication comprises: determining a quantity of symbols allocated for the DCI communication within a time domain resource allocation for the PDSCH transmission, wherein a last symbol of the quantity of symbols allocated for the DCI communication is a last symbol of the time domain resource allocation for the PDSCH transmission.

Aspect 81: The method of any of Aspects 77-80, wherein determining the time domain resource allocation for the DCI communication comprises: configuring the DCI time domain resource allocation format bit field, in the scheduling DCI, to indicate a format of the time domain resource allocation for the DCI communication.

Aspect 82: The method of any of Aspects 76-81, further comprising: determining a frequency domain resource allocation for the DCI communication, the frequency domain resource allocation indicating a frequency density value associated with the frequency domain resource allocation for the DCI communication, wherein the frequency density value indicates maximum a quantity of resource elements per resource block allocated for the PDSCH transmission; and configuring a DCI frequency domain resource allocation bit field, in the scheduling DCI, to indicate the frequency domain resource allocation for the DCI communication.

Aspect 83: The method of Aspect 82, further comprising: configuring the DCI frequency domain resource allocation bit field to be capable of indicating frequency density values from a subset of all possible frequency density values, wherein a quantity of possible frequency density values is based at least in part on a total quantity of resource elements per resource block.

Aspect 84: The method of any of Aspects 82-83, wherein determining the frequency domain resource allocation for the DCI communication comprises: determining a frequency density value indicating a quantity of resource elements of a resource block allocated for the DCI communication; determining an available quantity of resource elements of the resource block per symbol allocated to the DCI communication; determining that the available quantity of resource elements of the resource block in a symbol is less than the quantity of resource elements of the resource block allocated for the DCI communication indicated by the frequency density value; and determining a new quantity of resource elements of the resource block in the symbol allocated for the DCI communication based at least in part on the available quantity of resource elements of the resource block.

Aspect 85: The method of any of Aspects 76-84, further comprising: determining a size of the DCI communication; and configuring a DCI size bit field, in the scheduling DCI, to indicate the size of the DCI communication, wherein the size of the DCI communication is indicated in a quantity of bytes.

Aspect 86: The method of Aspect 85, wherein the size of the DCI communication is determined by the UE based at least in part on a table, and wherein the DCI size bit field indicates an entry in the table identifying the size of the DCI communication.

Aspect 87: The method of Aspect 85, wherein the size of the DCI communication is determined by the UE based at least in part on a code rate, and wherein the DCI size bit field indicates the code rate.

Aspect 88: The method of any of Aspects 76-87, further comprising: configuring a DCI presence bit, in the scheduling DCI that schedules the PDSCH transmission, indicating a presence of the DCI communication in the scheduling PDSCH transmission; and transmitting, to the UE, the scheduling DCI including the DCI presence bit indicating the presence of the DCI communication in the PDSCH transmission.

Aspect 89: An apparatus for wireless communication at a device, comprising a processor; memory coupled with the processor; and instructions stored in the memory and executable by the processor to cause the apparatus to perform the method of one or more Aspects of Aspects 1-31.

Aspect 90: A device for wireless communication, comprising a memory and one or more processors coupled to the memory, the memory and the one or more processors configured to perform the method of one or more Aspects of Aspects 1-31.

Aspect 91: An apparatus for wireless communication, comprising at least one means for performing the method of one or more Aspects of Aspects 1-31.

Aspect 92: A non-transitory computer-readable medium storing code for wireless communication, the code comprising instructions executable by a processor to perform the method of one or more Aspects of Aspects 1-31.

Aspect 93: A non-transitory computer-readable medium storing a set of instructions for wireless communication, the set of instructions comprising one or more instructions that, when executed by one or more processors of a device, cause the device to perform the method of one or more Aspects of Aspects 1-31.

Aspect 94: An apparatus for wireless communication at a device, comprising a processor; memory coupled with the processor; and instructions stored in the memory and executable by the processor to cause the apparatus to perform the method of one or more Aspects of Aspects 32-62.

Aspect 95: A device for wireless communication, comprising a memory and one or more processors coupled to the memory, the memory and the one or more processors configured to perform the method of one or more Aspects of Aspects 32-62.

Aspect 96: An apparatus for wireless communication, comprising at least one means for performing the method of one or more Aspects of Aspects 32-62.

Aspect 97: A non-transitory computer-readable medium storing code for wireless communication, the code comprising instructions executable by a processor to perform the method of one or more Aspects of Aspects 32-62.

Aspect 98: A non-transitory computer-readable medium storing a set of instructions for wireless communication, the set of instructions comprising one or more instructions that, when executed by one or more processors of a device, cause the device to perform the method of one or more Aspects of Aspects 32-62.

Aspect 99: An apparatus for wireless communication at a device, comprising a processor; memory coupled with the processor; and instructions stored in the memory and executable by the processor to cause the apparatus to perform the method of one or more Aspects of Aspects 63-75.

Aspect 100: A device for wireless communication, comprising a memory and one or more processors coupled to the memory, the memory and the one or more processors configured to perform the method of one or more Aspects of Aspects 63-75.

Aspect 101: An apparatus for wireless communication, comprising at least one means for performing the method of one or more Aspects of Aspects 63-75.

Aspect 102: A non-transitory computer-readable medium storing code for wireless communication, the code comprising instructions executable by a processor to perform the method of one or more Aspects of Aspects 63-75.

Aspect 103: A non-transitory computer-readable medium storing a set of instructions for wireless communication, the set of instructions comprising one or more instructions that, when executed by one or more processors of a device, cause the device to perform the method of one or more Aspects of Aspects 63-75.

Aspect 104: An apparatus for wireless communication at a device, comprising a processor; memory coupled with the processor; and instructions stored in the memory and executable by the processor to cause the apparatus to perform the method of one or more Aspects of Aspects 76-88.

Aspect 105: A device for wireless communication, comprising a memory and one or more processors coupled to the memory, the memory and the one or more processors configured to perform the method of one or more Aspects of Aspects 76-88.

Aspect 106: An apparatus for wireless communication, comprising at least one means for performing the method of one or more Aspects of Aspects 76-88.

Aspect 107: A non-transitory computer-readable medium storing code for wireless communication, the code comprising instructions executable by a processor to perform the method of one or more Aspects of Aspects 76-88.

Aspect 108: A non-transitory computer-readable medium storing a set of instructions for wireless communication, the set of instructions comprising one or more instructions that, when executed by one or more processors of a device, cause the device to perform the method of one or more Aspects of Aspects 76-88.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a first downlink control information (DCI) communication that schedules a physical downlink shared channel (PDSCH) transmission, the first DCI communication including an indication of a resource allocation and a size for a second DCI communication within the PDSCH transmission, wherein the resource allocation for the second DCI communication includes one or more resources included in a resource allocation for the PDSCH transmission, and wherein the size comprises a quantity of resource elements per resource block; and
   receiving the second DCI communication within the PDSCH transmission based at least in part on the indication of the resource allocation and the size for the second DCI communication.

2. The method of claim 1, further comprising:
   identifying a time domain resource allocation for the second DCI communication based at least in part on a DCI time domain resource allocation bit field included in the first DCI communication, wherein the DCI time domain resource allocation bit field is configured to be capable of indicating a value from a subset of all possible values for a quantity of symbols within a slot.

3. The method of claim 2, wherein identifying the time domain resource allocation for the second DCI communication comprises:
   identifying a quantity of symbols allocated for the second DCI communication within the time domain resource allocation for the PDSCH transmission, wherein a first symbol of the quantity of symbols allocated for the second DCI communication is a first symbol of the time domain resource allocation for the PDSCH transmission.

4. The method of claim 2, wherein identifying the time domain resource allocation for the second DCI communication comprises:
   identifying a quantity of symbols allocated for a demodulation reference signal (DMRS) within the time domain resource allocation for the PDSCH transmission; and
   identifying a quantity of symbols allocated for the second DCI communication within the time domain resource allocation for the PDSCH transmission, wherein a first symbol of the quantity of symbols allocated for the second DCI communication is a next symbol after a last symbol of the quantity of symbols allocated for the DMRS.

5. The method of claim 2, wherein identifying the time domain resource allocation for the second DCI communication comprises:
identifying a quantity of symbols allocated for the second DCI communication within the time domain resource allocation for the PDSCH transmission, wherein a last symbol of the quantity of symbols allocated for the second DCI communication is a last symbol of the time domain resource allocation for the PDSCH transmission.

6. The method of claim 2, wherein identifying the time domain resource allocation for the second DCI communication comprises:
identifying a format of the time domain resource allocation for the second DCI communication based at least in part on a DCI time domain resource allocation format bit field included in in the first DCI communication.

7. The method of claim 1, further comprising:
identifying a frequency domain resource allocation for the second DCI communication based at least in part on a DCI frequency domain resource allocation bit field included in the first DCI communication, wherein the frequency domain resource allocation indicates a maximum quantity of the resource elements per resource block allocated for the second DCI communication.

8. The method of claim 7, wherein the frequency domain resource allocation indicates a frequency density value that is configured to be capable of indicating frequency density values from a subset of all possible frequency density values, wherein a quantity of possible frequency density values is based at least in part on a total quantity of the resource elements per resource block.

9. The method of claim 7, wherein identifying the frequency domain resource allocation for the second DCI communication comprises:
identifying a frequency density value indicating Hall the quantity of resource elements of a resource block allocated for the second DCI communication;
determining an available quantity of resource elements of the resource block per symbol allocated for the second DCI communication;
determining that the available quantity of resource elements of the resource block in a symbol is less than the quantity of resource elements of the resource block allocated for the second DCI communication indicated by the frequency density value; and
determining a new quantity of resource elements of the resource block in the symbol allocated for the second DCI communication based at least in part on the available quantity of resource elements of the resource block.

10. The method of claim 1, further comprising:
identifying the size of the second DCI communication based at least in part on a DCI size bit field included in the first DCI communication, wherein the size of the second DCI communication is indicated in a quantity of bytes.

11. The method of claim 10, wherein the size of the second DCI communication is determined based at least in part on a table, and
wherein the DCI size bit field indicates an entry in the table identifying the size of the second DCI communication.

12. The method of claim 10, wherein the DCI size bit field indicates a code rate, and
wherein identifying the size of the second DCI communication is based at least in part on the code rate.

13. The method of claim 1, further comprising:
identifying a DCI presence bit, in a first DCI communication that schedules the PDSCH transmission, indicating a presence of a DCI in the PDSCH transmission; and
determining that the PDSCH transmission includes the second DCI communication based at least in part on identifying the DCI presence bit.

14. A user equipment (UE) for wireless communication, comprising:
one or more memories; and
one or more processors coupled to the one or more memories, the one or more processors configured to:
receive a first downlink control information (DCI) communication that schedules a physical downlink shared channel (PDSCH) transmission, the first DCI communication including an indication of a resource allocation and a size for a second DCI communication within the PDSCH transmission, wherein the resource allocation for the second DCI communication includes one or more resources included in a resource allocation for the PDSCH transmission, and wherein the size comprises a quantity of resource elements per resource block; and
receive the second DCI communication within the PDSCH transmission based at least in part on the indication of the resource allocation and the size for the second DCI communication.

15. The UE of claim 14, wherein the one or more processors are further configured to:
identify a time domain resource allocation for the second DCI communication based at least in part on a DCI time domain resource allocation bit field included in the first DCI communication, wherein the DCI time domain resource allocation bit field is configured to be capable of indicating a value from a subset of all possible values for a quantity of symbols within a slot.

16. The UE of claim 15, wherein the one or more processors are configured to, when identifying the time domain resource allocation for the second DCI communication:
identify a quantity of symbols allocated for the second DCI communication within the time domain resource allocation for the PDSCH transmission, wherein a first symbol of the quantity of symbols allocated for the second DCI communication is a first symbol of the time domain resource allocation for the PDSCH transmission.

17. The UE of claim 15, wherein the one or more processors are configured to, when identifying the time domain resource allocation for the second DCI communication:
identify a quantity of symbols allocated for a demodulation reference signal (DMRS) within the time domain resource allocation for the PDSCH transmission; and
identify a quantity of symbols allocated for the second DCI communication within the time domain resource allocation for the PDSCH transmission, wherein a first symbol of the quantity of symbols allocated for the second DCI communication is a next symbol after a last symbol of the quantity of symbols allocated for the DMRS.

18. The UE of claim 15, wherein the one or more processors are configured to, when identifying the time domain resource allocation for the second DCI communication:
identify a quantity of symbols allocated for the second DCI communication within the time domain resource allocation for the PDSCH transmission, wherein a last symbol of the quantity of symbols allocated for the second DCI communication is a last symbol of the time domain resource allocation for the PDSCH transmission.

19. The UE of claim 15, wherein the one or more processors are configured to, when identifying the time domain resource allocation for the second DCI communication:
identify a format of the time domain resource allocation for the second DCI communication based at least in part on a DCI time domain resource allocation format bit field included in the first DCI communication.

20. The UE of claim 14, wherein the one or more processors are further configured to:
identify a frequency domain resource allocation for the second DCI communication based at least in part on a DCI frequency domain resource allocation bit field included in the first DCI communication, wherein the frequency domain resource allocation indicates a maximum quantity of the resource elements per resource block allocated for the second DCI communication.

21. The UE of claim 20, wherein the frequency domain resource allocation indicates a frequency density value that is configured to be capable of indicating frequency density values from a subset of all possible frequency density values, wherein a quantity of possible frequency density values is based at least in part on a total quantity of the resource elements per resource block.

22. The UE of claim 20, wherein the one or more processors when identifying the frequency domain resource allocation for the second DCI communication are configured to:
identify a frequency density value indicating ilall the quantity of resource elements of a resource block allocated for the second DCI communication;
determine an available quantity of resource elements of the resource block per symbol allocated for the second DCI communication;
determine that the available quantity of resource elements of the resource block in a symbol is less than the quantity of resource elements of the resource block allocated for the second DCI communication indicated by the frequency density value; and
determine a new quantity of resource elements of the resource block in the symbol allocated for the second DCI communication based at least in part on the available quantity of resource elements of the resource block.

23. The UE of claim 14, wherein the one or more processors are further configured to:
identify the size of the second DCI communication based at least in part on a DCI size bit field included in the first DCI communication, wherein the size of the second DCI communication is indicated in a quantity of bytes.

24. The UE of claim 23, wherein the size of the second DCI communication is determined based at least in part on a table, and
wherein the DCI size bit field indicates an entry in the table identifying the size of the second DCI communication.

25. The UE of claim 23, wherein the DCI size bit field indicates a code rate, and
wherein identifying the size of the second DCI communication is based at least in part on the code rate.

26. The UE of claim 14, wherein the one or more processors are further configured to:
identify a DCI presence bit, in a first DCI communication that schedules the PDSCH transmission, indicating a presence of a DCI in the PDSCH transmission; and
determine that the PDSCH transmission includes the second DCI communication based at least in part on identifying the DCI presence bit.

27. A method of wireless communication performed by a base station, comprising:
determining a resource allocation and a size for a second downlink control information (DCI) communication, wherein the resource allocation for the second DCI communication includes one or more resources of a set of resources allocated for a physical downlink shared channel (PDSCH) transmission, and wherein the size comprises a quantity of resource elements per resource block; and
transmitting a first DCI communication that schedules the PDSCH transmission, the first DCI communication including an indication of the resource allocation and the size for the second DCI communication within the PDSCH transmission.

28. The method of claim 27, wherein determining the resource allocation for the second DCI communication comprises:
determining a time domain resource allocation for the second DCI communication;
determining a frequency domain resource allocation for the second DCI communication, the frequency domain resource allocation indicating a frequency density value associated with the frequency domain resource allocation for the second DCI communication; and
determining a size of the second DCI communication.

29. A base station for wireless communication, comprising:
one or more memories; and
one or more processors coupled to the one or more memories, the one or more processors configured to:
determine a resource allocation and a size for a second downlink control information (DCI) communication, wherein the resource allocation for the second DCI communication includes one or more resources of a set of resources allocated for a physical downlink shared channel (PDSCH) transmission, and wherein the size comprises a quantity of resource elements per resource block; and
transmit a first DCI communication that schedules the PDSCH transmission, the first DCI communication including an indication of the resource allocation and the size for the second DCI communication within the PDSCH transmission.

30. The base station of claim 29, wherein the one or more processors are configured to, when determining the resource allocation for the second DCI communication:
determine a time domain resource allocation for the second DCI communication;
determine a frequency domain resource allocation for the second DCI communication, the frequency domain resource allocation indicating a frequency density value associated with the frequency domain resource allocation for the second DCI communication; and
determine a size of the second DCI communication.

\* \* \* \* \*